United States Patent
Shimizu et al.

(10) Patent No.: US 7,599,512 B2
(45) Date of Patent: Oct. 6, 2009

(54) MULTI-PARAMETER HIGHLY-ACCURATE SIMULTANEOUS ESTIMATION METHOD IN IMAGE SUB-PIXEL MATCHING AND MULTI-PARAMETER HIGHLY-ACCURATE SIMULTANEOUS ESTIMATION PROGRAM

(75) Inventors: Masao Shimizu, Tokyo (JP); Masatoshi Okutomi, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 721 days.

(21) Appl. No.: 10/542,329

(22) PCT Filed: Oct. 29, 2003

(86) PCT No.: PCT/JP03/13874

§ 371 (c)(1),
(2), (4) Date: Jul. 13, 2005

(87) PCT Pub. No.: WO2004/063991

PCT Pub. Date: Jul. 29, 2004

(65) Prior Publication Data

US 2006/0133641 A1    Jun. 22, 2006

(30) Foreign Application Priority Data

Jan. 14, 2003    (JP)    ............................. 2003-005557

(51) Int. Cl.
*G06K 9/00*    (2006.01)
(52) U.S. Cl. ...................... 382/100; 382/195
(58) Field of Classification Search ................. 382/100, 382/195
See application file for complete search history.

(56) References Cited

U.S. PATENT DOCUMENTS 6,167,156 A * 12/2000 Antoniades et al. ......... 382/232

(Continued)

FOREIGN PATENT DOCUMENTS

JP    5-120436    5/1993

(Continued)

OTHER PUBLICATIONS

Shimizu, M. and M. Okutomi, "Koseido Subpixel Suitei Hoho no PIV Gazo eno Tekiyo (An Application of New Precise Sub-Pixel Estimation Method to PIV Images)", *Journal of the Visualization of Society of Japan*, vol. 21, No. 1, pp. 35-38 (Jul. 2001) with English-language abstract.

(Continued)

*Primary Examiner*—Charles Kim
*Assistant Examiner*—Stephen R Koziol
(74) *Attorney, Agent, or Firm*—Ladas & Parry LLP

(57) ABSTRACT

In consideration of N-dimensional similarity, a multiparameter high precision concurrent estimation method and a multiparameter high precision concurrent estimation program in image subpixel matching, which can estimate a correspondence parameter between images precisely, concurrently, and stably with a small amount of computation at high speed.

The method comprises the steps of: determining a sub-sampling position where the N-dimensional similarity value between images obtained at discrete positions is maximum or minimum on a line in parallel with a certain parameter axis, and determining an N-dimensional hyperplane that most approximates the determined sub-sampling position; determining N of the N-dimensional hyperplanes with respect to each parameter axis; determining an intersection point of N of the N-dimensional hyperplanes; and setting the intersection point as a sub-sampling grid estimation position for the correspondence parameter between images that gives a maximum value or a minimum value of N-dimensional similarity in the N-dimensional similarity space.

6 Claims, 25 Drawing Sheets

U.S. PATENT DOCUMENTS 6,690,828 B2* 2/2004 Meyers .................. 382/218
6,985,625 B1* 1/2006 Silver et al. ............. 382/195

FOREIGN PATENT DOCUMENTS

JP 7-129770 5/1995
JP 10-124666 5/1998

OTHER PUBLICATIONS

Shimizu, M. and M. Okutomi, "Precise Sub-Pixel Estimation on Area-Based Matching," *Paper of the Institute of Electronics, Information and Communication Engineers of Japan D-II*, vol. J84-D-II, No. 7, pp. 1409-1418 (Jun. 2001) with English-language abstract.

Shimizu, M. and M. Okutomi, "Significance and Attributes of Sub-Pixel Estimation on Area-Based Matching," *aper of the Institute of Electronics, Information and Communication Engineers of Japan D-II*, vol. J85-D-II, No. 12, pp. 1791-1800 (Dec. 2002) with Englsih-language abstract.

Shimizu, M. and M. Okutomi, "Precise Sub-Pixel Estimation on Area-Based Matching," *Proc. 8th IEEE International Conference on Computer Vision (ICCV2001)*, Vancouver, Canada, pp. 90-97, (Jul. 2001).

Shimizu, M. and M. Okutomi, "An Analysis of Sub-Pixel Estimation Error on Area-Based Image Matching," *Proc. 14th IEEE International Conference on Digital Signal Processing (DSP2002)*, Santorini, Greece, vol. II, pp. 1239-1242, (June 2002).

Davis, C., et al., "Equivalence of Subpixel Motion Estimators Based on Optical Flow and Block Matching," *IEEE International Symposium for Computer Vision*, Coral Gables, Florida, pp. 7-12 (Nov. 21-23, 1995).

Timoner, S.J. and D.M. Freeman, "Multi-Image Gradient-Based Algorithms for Motion Estimation," *Optical Engineering*, vol. 40, No. 9, pp. 2003-2016 (Mar. 29, 2001).

Brandt, J., "Improved Accuracy in Gradient-Based Optical Flow Estimation," *International Journal of Computer Vision*, vol. 25, No. 1, pp. 5-22 (1997).

Tian, Q. and M. Huhns, "Algorithms for Subpixel Registration," *Computer Vision, Graphics, and Image Processing*, vol. 35, pp. 220-233 (1986).

Borman, S., "Block-Matching Sub-Pixel Motion Estimation from Noisy, Under-Sampled Frames—An Empirical Performance Evaluation," *SPIE Visual Communications and Image Processing*, 10 pages (1999).

\* cited by examiner (a) IMAGE  $\theta_c = \pi/2$ (b) SELF-SIMILARITY OF (a)

(a) TWO-DIMENSIONAL IMAGE DENSITY (b) TWO-DIMENSIONAL SIMILARITY (a) $\theta c=\pi/2,\ \theta g=0$   (b) $\theta c=\pi/2,\ \theta g=\pi/8$   (c) $\theta c=\pi/2,\ \theta g=\pi/4$ (d) SIMILARITY OF (a)   (e) SIMILARITY OF (b)   (f) SIMILARITY OF (c)

(g) $\theta c=\pi/4,\ \theta g=0$   (h) $\theta c=\pi/4,\ \theta g=\pi/8$   (i) $\theta c=\pi/4,\ \theta g=\pi/4$ (j) SIMILARITY OF (g)   (k) SIMILARITY OF (h)   (l) SIMILARITY OF (i)

(a) fu=0.1, fv=0.1, θg=0  (b) fu=0.1, fv=0.1, θg=π/8  (c) fu=0.1, fv=0.1, θg=π/4

(d) SIMILARITY OF (a)  (e) SIMILARITY OF (b)  (f) SIMILARITY OF (c)

(g) fu=0.05, fv=0.1, θg=0  (h) fu=0.05, fv=0.1, θg=π/8  (i) fu=0.05, fv=0.1, θg=π/4

(j) SIMILARITY OF (g)  (k) SIMILARITY OF (h)  (l) SIMILARITY OF (i)

(a) $\sigma=2, k=1, \theta g=0$ (b) $\sigma=2, k=1, \theta g=\pi/8$ (c) $\sigma=2, k=1, \theta g=\pi/4$ (d) SIMILARITY OF (a)  (e) SIMILARITY OF (b)  (f) SIMILARITY OF (c)

(g) $\sigma=2, k=0.5, \theta g=0$  (h) $\sigma=2, k=0.5, \theta g=\pi/8$  (i) $\sigma=2, k=0.5, \theta g=\pi/4$ (j) SIMILARITY OF (g)  (k) SIMILARITY OF (h)  (l) SIMILARITY OF (i)

(a) $\sigma=1$, $\theta g=0$, $\theta c=\pi/4$     (b) fu=0.05, fv=0.1, $\theta g=0$     (c) $\sigma=2$, k=0.5, $\theta g=0$ (d) SIMILARITY OF (a)     (e) SIMILARITY OF (b)     (f) SIMILARITY OF (c)

(g) PART OF (d)     (h) PART OF (e)     (i) PART OF (f)

(a) SIMILARITY IN CONTINUOUS AREA    (b) SIMILARITY IN DISCRETE AREA (a) TWO-DIMENSIONAL SIMILARITY MODEL AND ITS MAJOR AXIS (b) HEL AND VEL (a) TRADITIONAL ONE-DIMENSIONAL ESTIMATION (b) TWO-DIMENSIONAL ESTIMATION ACCORDING TO THE PRESENT INVENTION (a) WEIGHTING FUNCTION (a=−0.55)

(b) INTERPOLATION RESULT (c) WEIGHTING FUNCTION (a=−1.0)

(d) INTERPOLATION RESULT (a) EXPERIMENT IMAGE (b) SELF-SIMILARITY OF TARGET (c) MEASUREMENT TRACE OF (a) USING 1D-EEC (d) MEASUREMENT TRACE OF (a) USING 2D-EEC (e) EXPERIMENT IMAGE (f) SELF-SIMILARITY OF TARGET (g) MEASUREMENT TRACE OF (e) USING 1D-EEC (h) MEASUREMENT TRACE OF (e) USING 2D-EEC

US 7,599,512 B2

MULTI-PARAMETER HIGHLY-ACCURATE SIMULTANEOUS ESTIMATION METHOD IN IMAGE SUB-PIXEL MATCHING AND MULTI-PARAMETER HIGHLY-ACCURATE SIMULTANEOUS ESTIMATION PROGRAM

TECHNICAL FIELD

The present invention relates to an estimation method and an estimation program using region-based matching, which can be used in many fields of image processing, such as image position sensing, remote sensing, mapping using aerial photographs, stereo vision, image stitching (mosaicing), moving images alignment, and 3D modeling, and particularly relates to a multiparameter high precision concurrent estimation method and a multiparameter high precision concurrent estimation program in image subpixel matching.

BACKGROUND TECHNIQUE

In many fields of image processing, such as stereo image processing, tracking, image sensing, remote sensing, and image registration, region-based matching is adopted as a basic process for obtaining a displacement between images.

The region-based matching is characterized in that the size and shape of a focused area can be set freely, the focused area can be offset with respect to focused pixels, and computation is self-explanatory to allow directly implement. When displacement between images is determined in subpixels by region-based matching, a method is generally used in which similarity evaluation values discretely obtained in pixels are used to estimate subpixel displacement.

In order to determine correspondence between images, an evaluation value called similarity is used. The similarity is a function that a relative position relationship between images is set to input and similarity between images at that position relationship is set to output. For the similarity, the value is determined by a discrete position in pixels. Thus, when the correspondence position relationship between images is determined based only on the similarity, it is limited to resolution in pixels. Then, interpolation is implemented based on the similarity value to determine the correspondence between images for subpixel resolution.

Traditionally, in order to expand position resolution, subpixel estimation is often implemented by fitting interpolation of the similarity evaluation value. However, when the translation amount of image is determined in subpixel resolution, an image is fitting interpolated separately in the horizontal direction and in the vertical direction. Therefore, a problem arises that sufficient accuracy cannot be obtained.

In short, traditionally, in region-based matching using a digital image, in order to improve the estimation resolution of displacement, subpixel estimation has been implemented in which the similarity evaluation value is used separately in the horizontal/vertical direction of the image.

Furthermore, traditionally, when a gradient-based method is used to determine displacement between images, the amount of subpixel displacement can be obtained from the first moment. In the gradient-based method, the horizontal direction and the vertical direction are treated together. However, when displacement between images is one or more pixels, the image needs to be scaled down. Generally, it is implemented at the same time when the scale for the image is changed. Since implement of the gradient-based method is recursive computation, it has defects that it is difficult to estimate computation time and to implement it on hardware.

Moreover, in a traditional method in which an image is discrete Fourier transformed to determine a product of complex conjugates for inverse discrete Fourier transformation, the size of a focused area needs to be $2^n$, requiring various techniques. This method is often used in the field of fluid measurement, having the characteristic in that the amount of computation can be reduced. However, in the vision field, it is rarely used. In addition to this, since it uses a assumption that a measurement object is a plane, the method has a defect that it is difficult to apply the method to a measurement object with irregularity.

Traditionally, an image is interpolated and estimated separately in the horizontal direction and in the vertical direction, as described in detail below. However, according to a traditional method like this, it has a problem that an estimation error is generated as shown in FIG. 1.

Here, the traditional method is called a "one-dimensional estimation method", in which an image is considered to be independent in the horizontal direction and in the vertical direction, and subpixel estimation of displacement is separately implemented.

In order to describe the problems of the traditional one-dimensional estimation method, first, we consider the problem that determines displacement in the horizontal direction between images. Suppose true displacement between images is $(d_s, d_t)$, and the rotation angle of similarity with anisotropy is $\theta_g$. In the one-dimensional estimation method, $R(-1,0)$, $R(0,0)$, $R(1,0)$ (squares in FIG. 1) were used for discretization similarity, and $\hat{d}_s$ (a black circle in FIG. 1) was estimated by the following Equation 1.

$$\hat{d}_s = \frac{R(-1, 0) - R(1, 0)}{2R(-1, 0) - 4R(0, 0) + 2R(1, 0)} \quad \text{(Equation 1)}$$

Even though the position of the maximum similarity on line t=0 can be correctly estimated by the above Equation 1, as apparent from FIG. 1, a great estimation error is contained in the true horizontal direction displacement between images $d_s$ (a horizontal component of a black triangle in FIG. 1). More specifically, when all the following conditions are true, a horizontal estimation error is generated for $\hat{d}_s - d_s \neq 0$.

Vertical direction displacement is $d_t \neq 0$.

Two-dimensional similarity has anisotropy.

The rotation angle $\theta_g \neq 0$ in the two-dimensional similarity with anisotropy.

Almost all images fall in the conditions above.

Furthermore, it is similar in the vertical direction. For example, when the SSD self-similarity of the corner area of an image shown in FIG. 2(a) is determined, it is as shown in FIG. 2(b). Since the self-similarity has anisotropy and $\theta_g \neq 0$, it is shown that there is the possibility to generate a subpixel estimation error in the traditional one-dimensional estimation method. Moreover, it is shown that there is the possibility to generate an estimation error also in subpixel estimation using a texture image shown in FIG. 3(a).

Furthermore, depending on the field of computer vision, since constraint conditions such as epipolar constraint are used to limit the search area one-dimensionally, in some cases, it is enough to implement high precision matching for one-dimensional signals. However, there are various uses that require high precision two-dimensional displacement using two-dimensional images. For example, they are motion estimation, region segmentation by motion estimation, target tracking, mosaicing, remote sensing, super-resolution, etc.

In region-based matching for images, in the case where displacement between images can be expressed only by translation, many methods are traditionally proposed for actually use. For example, for a typical method, a subpixel estimation method that combines region-based matching with a similarity interpolation method estimates subpixel displacement between images as follows.

When images that determine a correspondence position are f(i,j) and g(i,j), SAD between images with respect to displacement $(t_x, t_y)$ in integers is computed as follows.

$$R_{SAD}(t_x, t_y) = \sum_{(i,j) \in W} |f(i, j) - g(i - t_x, j - t_y)| \quad \text{(Equation 2)}$$

Where SAD represents the sum of absolute values of luminance difference (Sum of Absolute Differences), and W represents a focused area for correspondence. SAD becomes zero when the images are completely matched, and takes a greater value as mismatches are increased. Since SAD expresses an evaluation value of dissemblance, it is non-similarity.

Instead of SAD, the following SSD is often used.

$$R_{SSD}(t_x, t_y) = \sum_{(i,j) \in W} (f(i, j) - g(i - t_x, j - t_y))^2 \quad \text{(Equation 3)}$$

Where SSD represents the sum of squares of absolute values of luminance difference (Sum of Squared Differences). SSD also becomes zero when the images are completely matched, and takes a greater value as mismatches are increased. Since SSD also expresses an evaluation value of dissemblance, it is non-similarity.

Instead of SAD and SSD, the following correlation coefficient (ZNCC: Zero-mean Normalized Cross-Correlation) is sometimes used. ZNCC regards the pixel density in a focused area as statistical data, and computes statistical correlation values between focused areas.

$$R_{ZNCC}(t_x, t_y) = \frac{\sum_{(i,j) \in W} ((f(i,j) - \bar{f})(g(i-t_x, j-t_y) - \bar{g}))}{\sqrt{\sum_{(i,j) \in W} (f(i,j) - \bar{f})^2 \times \sum_{(i,j) \in W} (g(i-t_x, j-t_y) - \bar{g})^2}} \quad \text{(Equation 4)}$$

Where $\bar{f}$ and $\bar{g}$ are mean densities of the respective areas. $R_{ZNCC}$ takes values from −1 to 1. It becomes 1 when the images are completely matched, and takes a smaller value as mismatches are increased. The characteristic of ZNCC is in that it can obtain almost the same similarity even though there are variations in density and contrast between images.

Although ZNCC is called similarity because it represents the evaluation value of similarity, SAD and SSD represent non-similarity. Here, for easy description, hereinafter, SAD, SSD, and ZNCC are denoted as "similarity" in a unified manner.

By searching the displacement $(\hat{t}_x, \hat{t}_y)$ in integers where similarity is the minimum value (in SAD and SSD) or the maximum value (in ZNCC), displacement in integers between images can be obtained. After the displacement in integers is obtained, subpixel displacement is estimated as follows.

$$\hat{d}_x = \frac{R(\hat{t}_x - 1) - R(\hat{t}_x + 1)}{2R(\hat{t}_x - 1) - 4R(\hat{t}_x) + 2R(\hat{t}_x + 1)} \quad \text{(Equation 5)}$$

$$\hat{d}_y = \frac{R(\hat{t}_y - 1) - R(\hat{t}_y + 1)}{2R(\hat{t}_y - 1) - 4R(\hat{t}_y) + 2R(\hat{t}_y + 1)}$$

With the use of the above Equation 5, the subpixel displacement between images finally obtained is $(\hat{t}_x + \hat{d}_x, \hat{t}_y + \hat{d}_y)$.

In a traditional method like this, there is a problem that a correct correspondence cannot be obtained when there are rotation and scale variation between images. Even though there is a slight rotation angle between images, it is determined that two images are different, causing problems that a correspondence position is not found and that correspondence is detected at a wrong position.

On the other hand, when the correspondence between images cannot be expressed only by translation, that is, there are rotation and scale variation between images, it is necessary to estimate rotation and scale variation at the same time. Traditionally, at this time, it is necessary that an interpolation process is used to allow one of images (template image) to undergo translation and rotation or scale variation and then matching, each parameter is varied while similarity is being computed, and a parameter is searched that the similarity is the minimum value or the maximum value. Next, this parameter search algorithm will be described.

When f(i,j) is a template image, and g(i,j) is an input image, the similarity $R_{SSD}$ is computed as below where translation $(t_x, t_y)$, the rotation angle θ, and the scale variation s are parameters.

$$R_{SSD}(t_x, t_y, \theta, s) = \sum_{(i,j) \in W} (f(i, j) - \tilde{g}(i, j, t_x, t_y, \theta, s))^2 \quad \text{(Equation 6)}$$

Where $\tilde{g}(i,j,t_x,t_y,\theta,s)$ represents an interpolation image of image g(i,j) at position (i,j) when translation $(t_x, t_y)$, the rotation angle θ, and the scale variation s are given. When an interpolation image is generated, bilinear interpolation (Bi-Linear interpolation), bicubic interpolation (Bi-Cubic interpolation), etc. are used. In addition, SAD and ZNCC may be used, not SSD.

The initial parameters $(t_x, t_y, \theta, s)^{<0>}$ are determined by some method to compute $R_{SSD}(t_x, t_y, \theta, s)^{<0>}$ and search update parameters $(t_x, t_y, \theta, s)^{<1>}$ that give smaller $R_{SSD}$. Even though parameters are updated, update is continued until variations are eliminated from the result. At this time, a numerical solution is used, including Newton-Raphson method, Steepest (Gradient) Descent method (steepest-descent method), and Levenberg-Marquadt method.

Suppose for the initial parameters $(t_x, t_y, \theta, s)^{<0>}$, correspondence between images can be expressed only by translation, $(\hat{t}_x, \hat{t}_y, 0, 1)^{<0>}$ is used that uses $(\hat{t}_x, \hat{t}_y)$ estimated by typical region-based matching.

In multiparameter optimization like this, there is a problem that a correct result cannot be obtained when initial values are not suitable. Furthermore, there is also a problem that solutions cannot be obtained because of influence of image patterns, noise, and optical distortion due to lens. Moreover, there is a difficulty that computation time cannot be estimated because of the use of recursive computation. Therefore, it is extremely difficult to form into hardware in regard to implementing algorithms because total response time of a completed system cannot be estimated correctly. In regard to computation time, it is necessary to interpolate an image at each step of recursive computation, but longer computation time is required because the image interpolation operation has a great operation volume. Furthermore, in regard to estimation accuracy, since the properties of an interpolation image are different depending on image interpolation methods, it is a great problem in that an interpolation method to be adopted causes variations in final parameter estimation accuracy and the properties of estimation error.

The present invention has been made in view of circumstances. An object of the invention is to solve the problems of the above traditional methods in consideration of N-dimensional similarity, and to provide a multiparameter high precision concurrent estimation method and a multiparameter high precision concurrent estimation program in image subpixel matching, which can estimate correspondence parameters between images stably, highly precisely, concurrently, at high speed with a small amount of computation.

DISCLOSURE OF THE INVENTION

The invention relates to a multiparameter high precision concurrent estimation method in image subpixel matching. The above object of the invention is achieved effectively by providing a multiparameter high precision concurrent estimation method in image subpixel matching in which in an N-dimensional similarity space where N (N is an integer of four or greater) correspondence parameters between images are axes, said N correspondence parameters between images are estimated precisely and concurrently by using an N-dimensional similarity value between images obtained at discrete positions, comprising the steps of:

determining a sub-sampling position where said N-dimensional similarity value between images is maximum or minimum on a line in parallel with a certain parameter axis, and determining an N-dimensional hyperplane that most approximates determined said sub-sampling position;

determining N of said N-dimensional hyperplanes with respect to each parameter axis;

determining an intersection point of N of said N-dimensional hyperplanes; and setting said intersection point as a sub-sampling grid estimation position for said correspondence parameter between images that gives a maximum value or a minimum value of N-dimensional similarity in said N-dimensional similarity space.

Furthermore, the invention relates to a three-parameter high precision concurrent estimation method in image subpixel matching. The above object of the invention is achieved effectively by providing a three-parameter high precision concurrent estimation method in image subpixel matching in which in a three-dimensional similarity space where three correspondence parameters between images are axes, said three correspondence parameters between images are estimated precisely and concurrently by using a three-dimensional similarity value between images obtained at discrete positions, comprising the steps of:

determining a sub-sampling position where said three-dimensional similarity value between images is maximum or minimum on a line in parallel with a certain parameter axis, and determining a plane that most approximates determined said sub-sampling position;

determining three of said planes with respect to each parameter axis;

determining an intersection point of three of said planes; and setting said intersection point as a sub-sampling grid estimation position for said correspondence parameter between images that gives a maximum value or a minimum value of three-dimensional similarity in said three-dimensional similarity space.

Besides, the invention relates to a two-parameter high precision concurrent estimation method in image subpixel matching. The above object of the invention is achieved effectively by providing a two-parameter high precision concurrent estimation method in image subpixel matching in which a position of a maximum value or a minimum value of a two-dimensional similarity in a continuous area is estimated precisely by using a two-dimensional similarity value between images obtained discretely, comprising the steps of:

determining a sub-sampling position where said two-dimensional similarity value between images is maximum or minimum on a line in parallel with a horizontal axis, and determining a line (horizontal extreme value line HEL) that most approximates determined said sub-sampling position;

determining a sub-sampling position where said two-dimensional similarity value between images is maximum or minimum on a line in parallel with a vertical axis, and determining a line (vertical extreme value line VEL) that most approximates determined said bsub-sampling position;

determining an intersection point of said horizontal extreme value line HEL and said vertical extreme value line VEL; and setting said intersection point as a subpixel estimation position that gives a maximum value or a minimum value of said two-dimensional similarity.

BEST MODE FOR CARRYING OUT THE INVENTION

Figure 1:
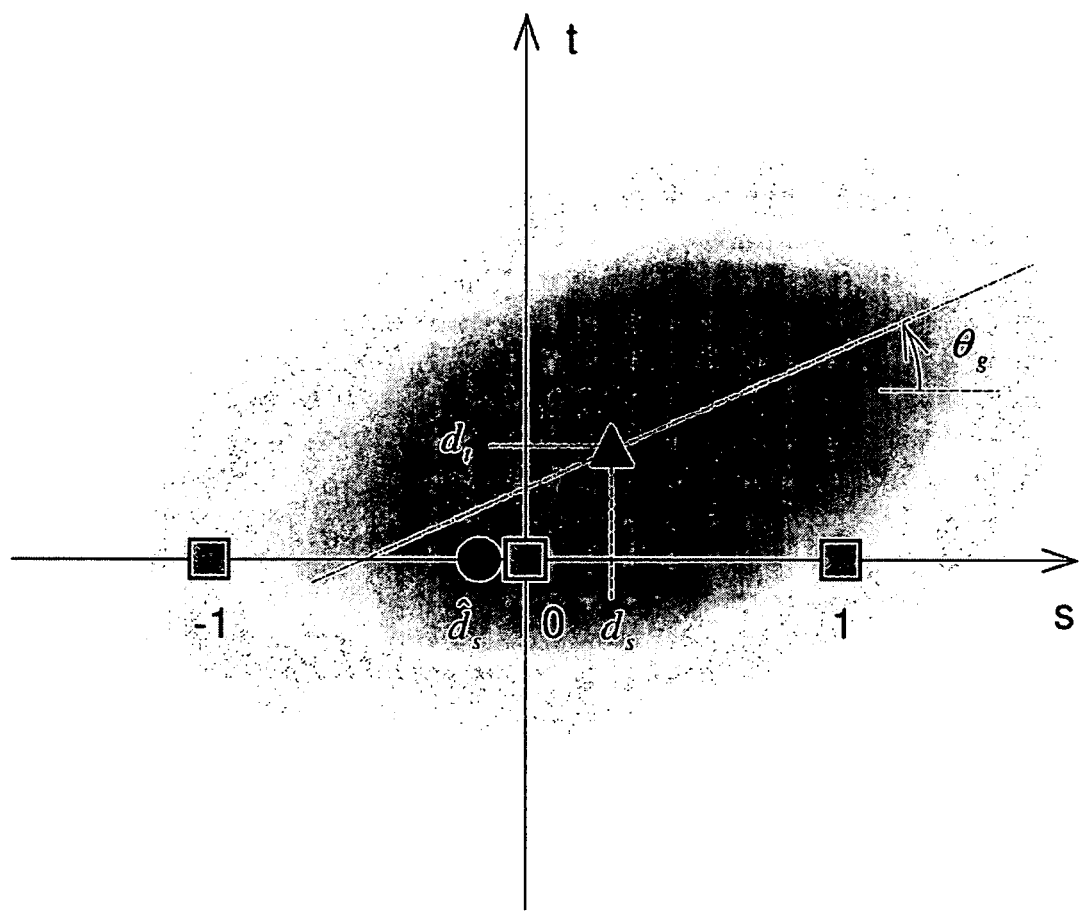
FIG. 1 is an illustrative diagram of a traditional one-dimensional subpixel estimation method. $d_s$ is a position estimated by the traditional one-dimensional subpixel estimation method using three similarity values, s=−1,0,1. The estimated value has an error with respect to a true peak position where $d_t \ne 0$ and $\theta_g \ne 0$.

Herein after, preferred embodiments according to the invention will be described with reference to the drawings and equations.

Embodiment 1

In embodiment 1 of a multiparameter high precision concurrent estimation method in image subpixel matching according to the invention, the two-dimensional similarity that has been determined in the sampling period of an image is used to estimate two-dimensional subpixel displacement (that is, displacement between images in the horizontal and vertical directions) highly precisely at the same time, which gives the maximum value or the minimum value of the two-dimensional similarity.

Here, the traditional method is called a "one-dimensional estimation method" in which an image is considered to be independent in the horizontal direction and in the vertical direction and subpixel estimation of displacement is also independently implemented, whereas the multiparameter high precision concurrent estimation method in image subpixel matching of embodiment 1 according to the invention uses two-dimensional similarity at discrete positions computed from a two-dimensional image for two-dimensional subpixel estimation. Therefore, it is called a "high precision two-dimensional estimation method in image subpixel matching" or a "two-dimensional subpixel estimation method", and further abbreviated to a "two-dimensional estimation method".

The two-dimensional estimation method of embodiment 1 according to the invention, described later, is a high precision concurrent estimation method using region-based matching. As compared with the traditional "one-dimensional estimation method", the amount of computation is slightly increased to allow an overwhelmingly highly precise two-dimensional subpixel estimation.

(1) Two-Dimensional Image Model and Two-Dimensional Similarity Model

Here, several types of image models are taken to consider two-dimensional similarity. It will be shown that the two-dimensional similarity obtained from different image models can be approximated by the same two-dimensional similarity model.

Region-based matching is that similarity between two images is evaluated to determine the maximum or the minimum position as displacement between the two images. The similarity is usually matched with the sampling period of an image, and values can be obtained with respect to non-consecutive displacement positions. Matching in pixels corresponds to a search of the maximum value or the minimum value in similarity. Subpixel estimation is that the similarity is interpolated to estimate a subpixel displacement position which gives the maximum value or the minimum value in subpixels. In the description below, "the maximum or the minimum" is simply expressed as "the maximum". When SAD and SSD similarities are used, it means "the minimum", and when correlation similarity is used, it means "the maximum".

(1-1) Corner Model

First, for a two-dimensional image model that allows region-based matching and subpixel estimation, the following one-dimensional image model is simply expanded.

$$f(u) = 2 \int_0^u \frac{1}{\sqrt{2\pi}\,\sigma_{image}} e^{-\frac{\xi^2}{2\sigma_{image}^2}} d\xi \quad \text{(Equation 7)}$$

Then, consider a corner image expressed by the following Equation 8. Here, $\sigma_{image}$ is the sharpness of a density edge. This corner image is shown in FIG. 4(a).

$$I_s(u,v)=f(u)f(v) \quad \text{(Equation 9)}$$

Where an image coordinate system is u-v, and a similarity coordinate system (displacement coordinate system) is s-t.

The SSD similarity (in the invention, the SSD similarity is sometimes called "self-similarity") can be obtained by the following Equation 9, in which the image expressed by the above Equation 8 is a reference image and completely the same image is used as an input image for two-dimensional matching. The SSD similarity shows that images are more similar as a value is smaller. Thus, in this case, the similarity is higher as it is a darker place. Since the self-similarity is the similarity that uses completely the same images, the similarity at the position of displacement (s,t)=(0,0) is the smallest. The similarity is shown in FIG. 4(b).

$$R(s, t) = \sum_{i,j \in W} (I_s(i, j) - I_s(i+s, j+t))^2 \quad \text{(Equation 9)}$$

Where the range of the total sum is the focused range in a given shape, but in FIG. 4(b), it was computed in a square area of 11×11.

Figure 4:
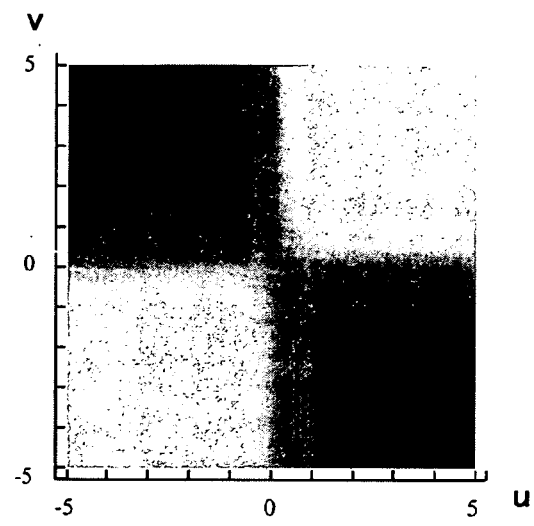
FIG. 4 is a diagram illustrating a two-dimensional image model and its two-dimensional similarity. (a) shows an image model of $\sigma_{image} = 0.7$, and the image size is 11×11 [pixel]. (b) shows the self-similarity of the image model, and the range of similarity is 11×11. The dark position of (s,t) corresponds to the displacement of two images having high similarity. (s,t) at the darkest position becomes (0,0) because of the properties of self-similarity.
Figure 4:
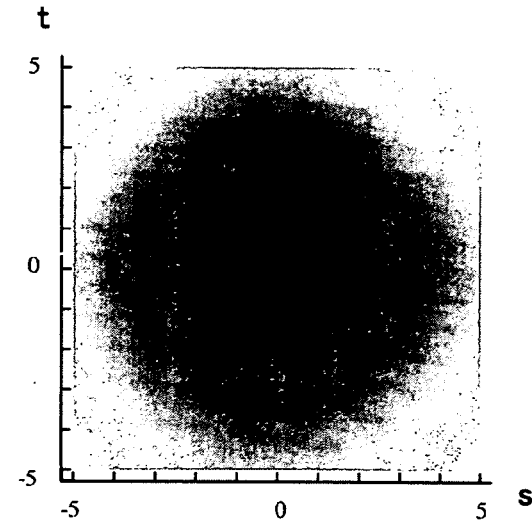

In FIG. 4 (a), a shear component is not contained in the corner, that is, density variation in the horizontal direction does not depend on any vertical positions, and thus a two-dimensional image can be treated independently in the horizontal direction and in the vertical direction. At this time, the similarity of the above Equation 9 can be treated independently in the horizontal direction and in the vertical direction as well. Therefore, the horizontal direction and the vertical direction can be treated independently also when the subpixel displacement position is estimated.

Figure 2:
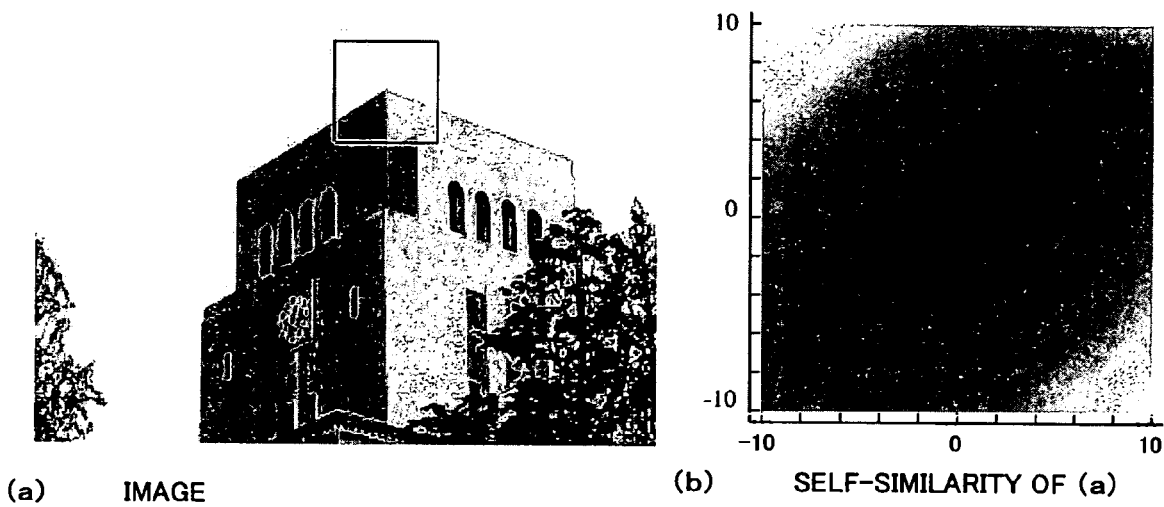
FIG. 2 is a diagram illustrating an exemplary image (a) generally for use in three-dimensional reconfiguration application, and its self-similarity (b). Since the self-similarity map has properties of k≠1 and $\theta_g \ne 0$, the self-similarity map shows that subpixel estimation error is generated when the traditional one-dimensional estimation method is used.

However, in an actual image, it is not necessarily configured of corners at an angle of 90 degrees. For example, when a stereo image of a building taken from the ground is used to reconfigure three-dimensional information, the corner area of the building is determined for the correspondence with the other image, but the corner is rarely taken at an angle of 90 degrees (see FIG. 2(a)).

Then, consider two two-dimensional images having a density edge at v=0 as:

$$I_a(u,v)=f(v)$$

$$I_b(u,v)=-F(v) \quad \text{(Equation 10)}$$

They are rotated to the left at $\theta_a$, and to the right at $\theta_b$.

$$I_a(u,v)=f(-u\sin(\theta_a)+v\cos(\theta_a))$$

$$I_b(u,v)=-f(u\sin(\theta_b)+v\cos(\theta_b)) \quad \text{(Equation 11)}$$

$\theta_a$, and $\theta_b$ are defined as below using the rotation angle of the entire image $\theta_g$ and the corner angle $\theta_c$.

$$\theta_a = \theta_g + \frac{\theta_c}{2} \quad \text{(Equation 12)}$$

$$\theta_b = -\theta_g + \frac{\theta_c}{2}$$

At this time, two-dimensional image model $I_c(u,v)$ expressed by using $I_a(u,v)$ and $I_b(u,v)$ is defined by the following Equation 13.

$$I_c(u, v) = I_a(u, v) I_b(u, v) \quad \text{(Equation 13)}$$

$$= -f\left(-u\sin\left(\theta_g + \frac{\theta_c}{2}\right) + v\cos\left(\theta_g + \frac{\theta_c}{2}\right)\right) \times$$

$$f\left(u\sin\left(-\theta_g + \frac{\theta_c}{2}\right) + v\cos\left(-\theta_g + \frac{\theta_c}{2}\right)\right)$$

Figure 5:
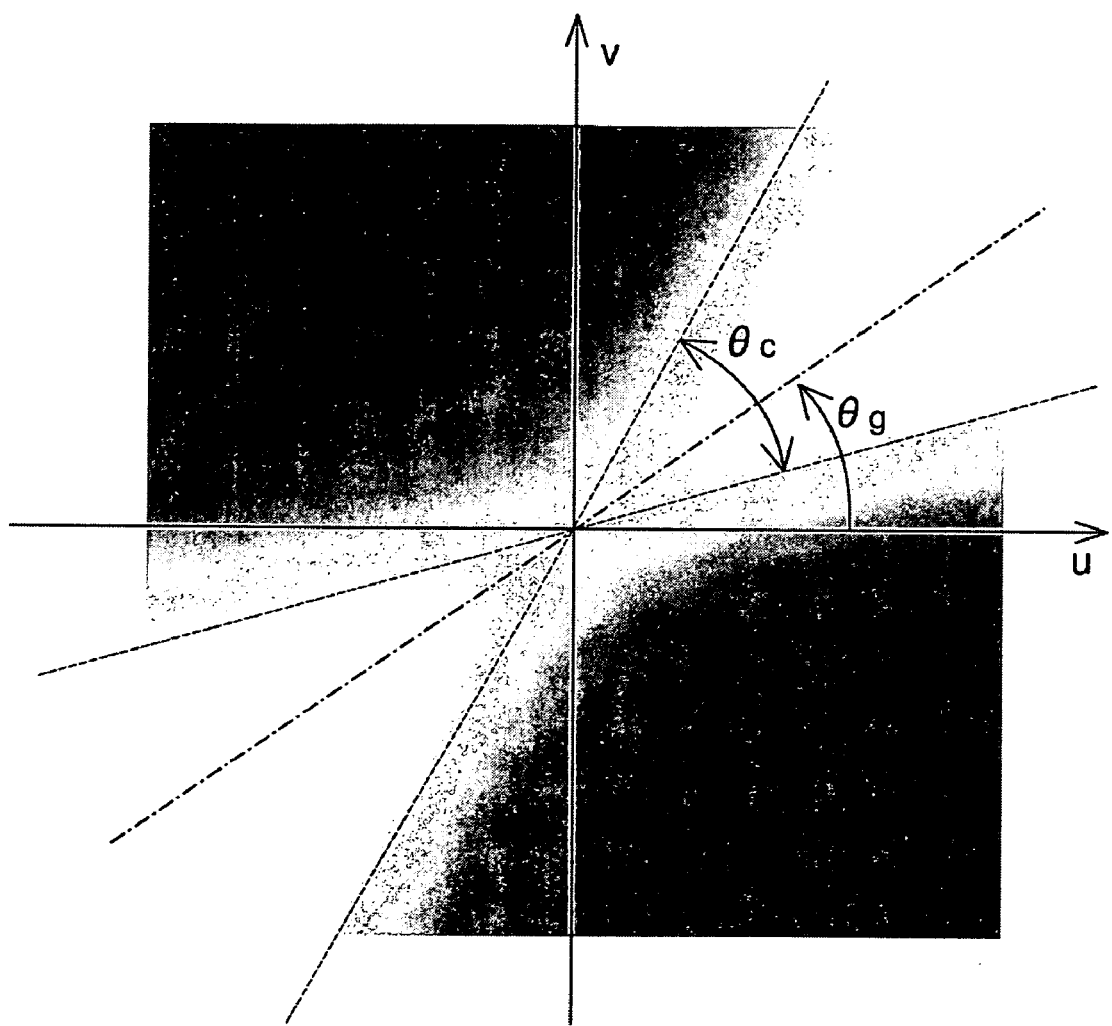
FIG. 5 is a diagram illustrating a two-dimensional corner image model having the rotation angle of the entire image $\theta_g$ and the corner angle $\theta_c$.
Figure 6:
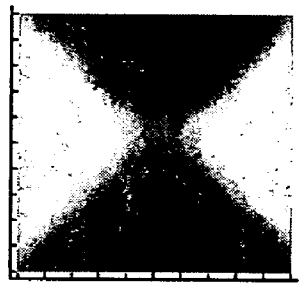
FIG. 6 is a diagram illustrating two-dimensional corner image model and two-dimensional self-similarity thereof. (a), (b), and (c) show an image model where $\theta_c = \pi/2$, $\sigma_{image} = 1$, and $\theta_g = 0, \pi/8, \pi/4$, respectively. (d), (e), and (f) show similarity corresponding to (a), (b), and (c), respectively. (g), (h), (i) show an image model where $\theta_c = \pi/4$, $\sigma_{image} = 1$, and $\theta_g = 0, \pi/8, \pi/4$, respectively. (j), (k), (l) show similarity corresponding to (g), (h), and (i), respectively.
Figure 6:
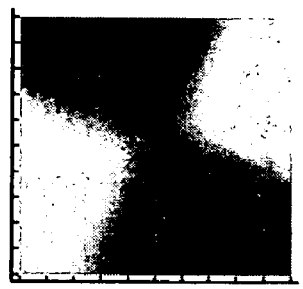
Figure 6:
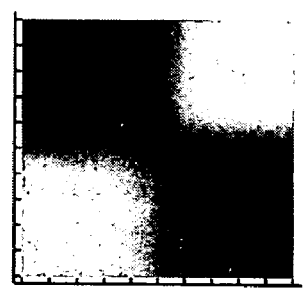
Figure 6:
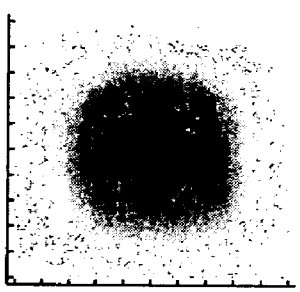
Figure 6:
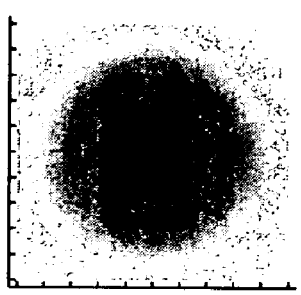
Figure 6:
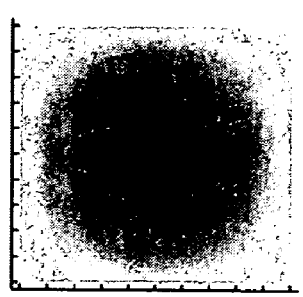
Figure 6:
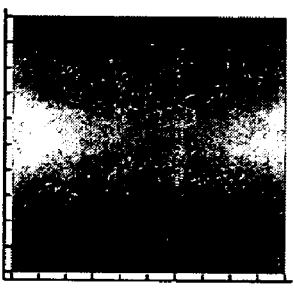
Figure 6:
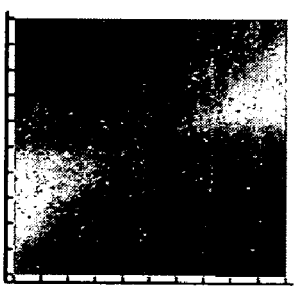
Figure 6:
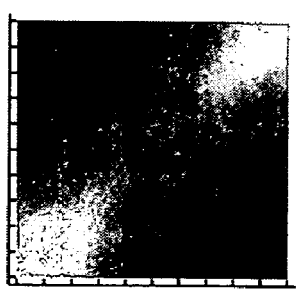
Figure 6:
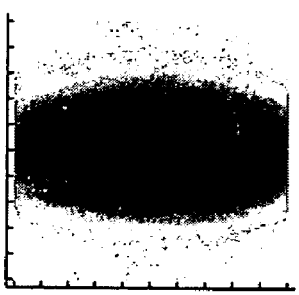
Figure 6:
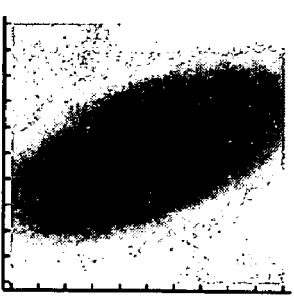
Figure 6:
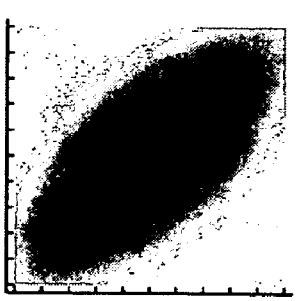

As shown in FIG. 5, the two-dimensional image model has the rotation angle of the entire image $\theta_g$, the corner angle $\theta_c$, and the sharpness of the two-dimensional density edge $\sigma_{image}$ as parameters. Consider the ranges of $0 \leq \theta_g \leq \pi/4$, $0 < \theta_c \leq \pi/2$. The range other than these can be expressed by inverting the image left to right of and by inverting shadings. When $\theta_g=\pi/4$, $\theta_c=\pi/2$, it is the same as the simple image model in the above Equation 8. FIGS. 6(a), (b), (c), (g), (h), and (i) show examples of the image model expressed by the above Equation 13. FIGS. 6(d), (e), (f), (j), (k), and (l) show the similarity corresponding to the two-dimensional images of FIGS. 6(a), (b), (c), (g), (h), and (i).

(1-2) Recursive Texture Model

When similarity has no directional dependency, that is, when similarity has isotropy, no error is generated even though subpixel estimation is done independently in the horizontal direction and in the vertical direction. However, when similarity has directional dependency (it is called "anisotropy" in the invention), that is, when the differential value is different depending on directions, there is the possibility to generate error when subpixel estimation is done independently in the horizontal direction and in the vertical direction.

Figure 3:
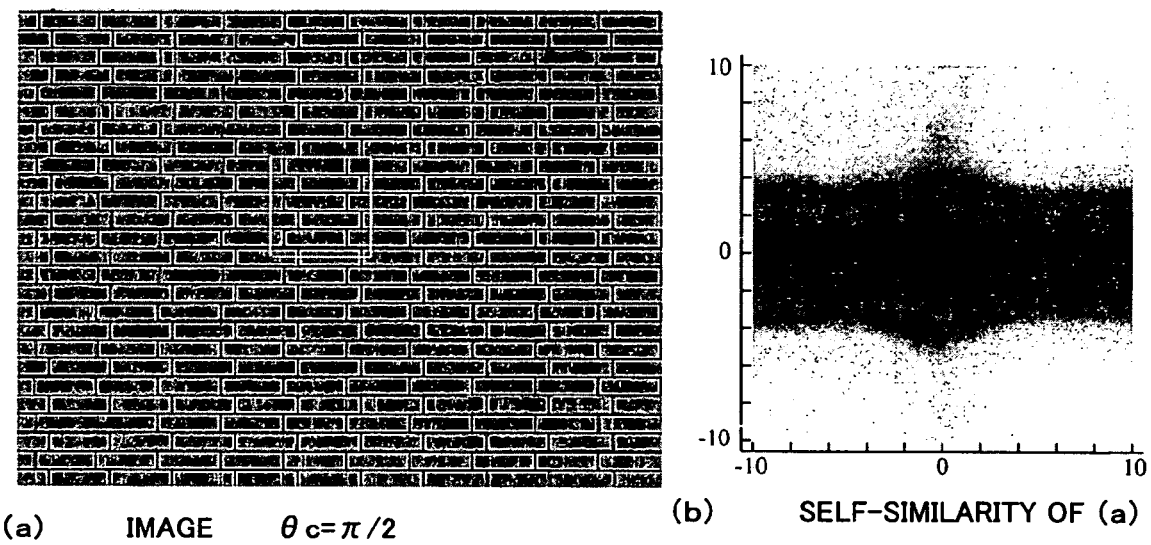
FIG. 3 is a diagram illustrating an exemplary texture image with $\theta_c = \pi/2$, and its self-similarity.

In the two-dimensional image model $I_c$ (u,v) expressed by the above Equation 13, anisotropy occurs in self-similarity when $\theta_c \neq \pi/2$. However, as it can be understood self-explanatorily, there is texture that causes anisotropy in self-similarity other than this. As an example for this, the SSD self-similarity of the image shown in FIG. 3(a) is shown in FIG. 3(b). Although the corner included in the texture is $\theta_c=\pi/2$, anisotropy appears in the similarity.

For the two-dimensional image model that causes anisotropy in the self-similarity even $\theta_c=\pi/2$, the following Equation 14 is considered.

$$I_t(u,v)=f_{1u}(\cos(\theta_g)u+\sin(\theta_g)v)f_{1v}(-\sin(\theta_g)u+\cos(\theta_g)v)$$

$$f_{1u}(x)=\sin(2\pi f_u x)$$

$$f_{1v}(y)=\sin(2\pi f_v y) \quad \text{(Equation 14)}$$

Figure 7:
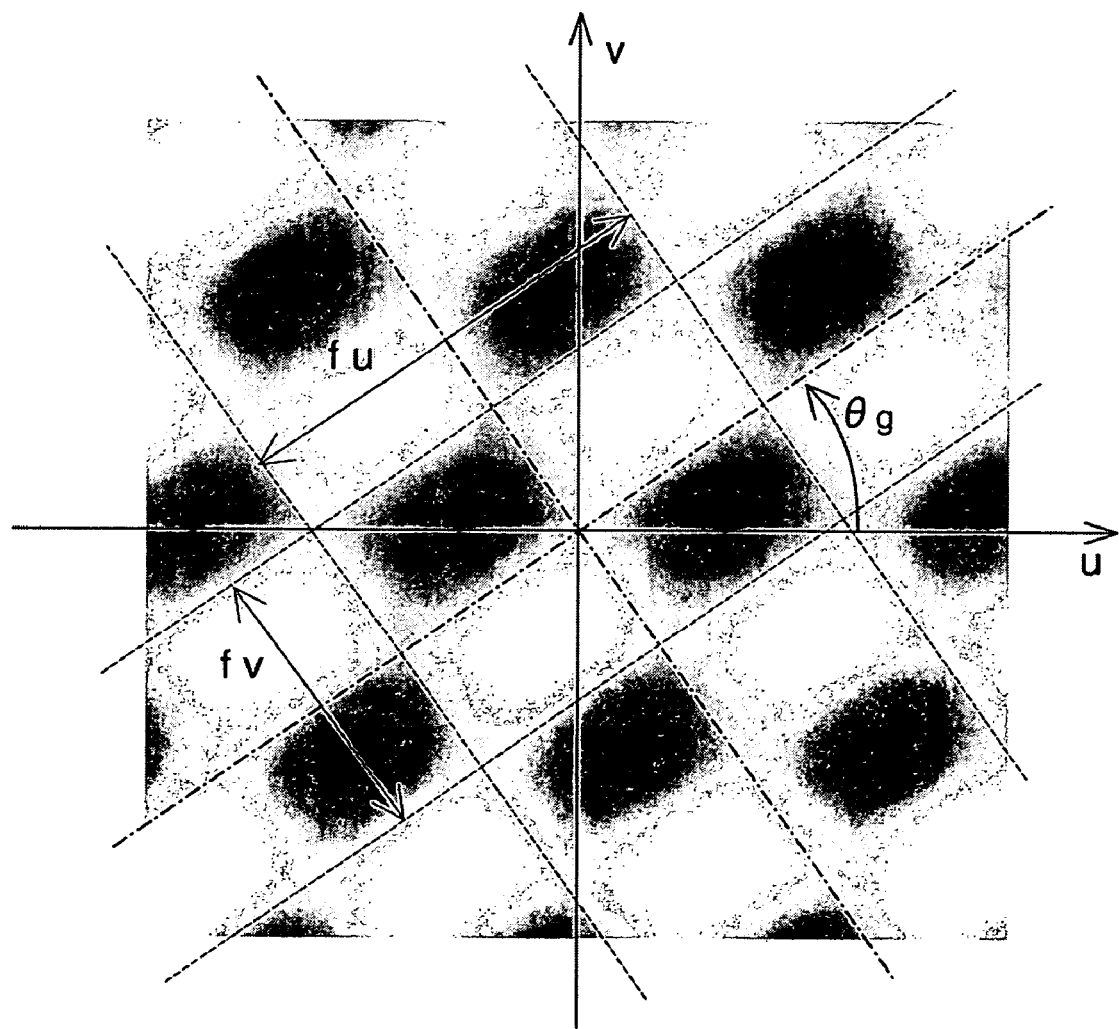
FIG. 7 is a diagram illustrating a two-dimensional recursive texture image model having the rotation angle of the entire image $\theta_g$, the horizontal direction spatial frequency $f_u$, and the vertical direction spatial frequency $f_v$.

As shown in FIG. 7, the two-dimensional image model $I_t(u,v)$ of the above Equation 14 has the u-direction spatial frequency $f_u$, the v-direction spatial frequency $f_v$, and the rotation angle of the image $\theta_g$ as parameters. The range of $0 \leq \theta_g \leq \pi/2$ is considered. When $f_u \neq f_v$, anisotropy occurs in the self-similarity. The anisotropy for the self-similarity corresponds to anisotropy for spatial frequency in texture. It can be considered that the anisotropy for spatial frequency occurs in the two-dimensional image model $I_c(u,v)$ introduced in the paragraph above when $\theta_c \neq \pi/2$.

Figure 8:
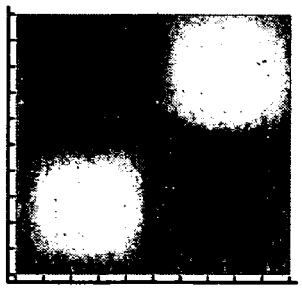
FIG. 8 is a diagram illustrating two-dimensional recursive texture image models and the two-dimensional self-similarity. (a), (b), and (c) show an image model where $f_u = 0.1$, $f_v = 0.1$, and $\theta_g 0, \pi/8, \pi/4$, respectively. (d), (e), and (f) show similarity corresponding to (a), (b), and (c), respectively. (g), (h), and (i) show an image model where $f_u = 0.05$, $f_v = 0.1$, and $\theta_g = 0, \pi/8, \pi/4$, respectively. (j), (k), (l) show similarity corresponding to (g), (h), and (i), respectively. The self-similarity can be obtained from two similar images having constant displacement. The image size is 11×11 [pixel], and the range of similarity is from −5 to 5.
Figure 8:
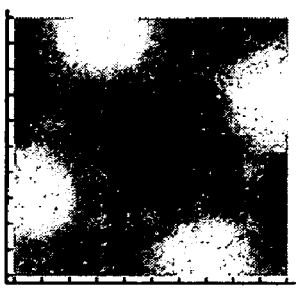
Figure 8:
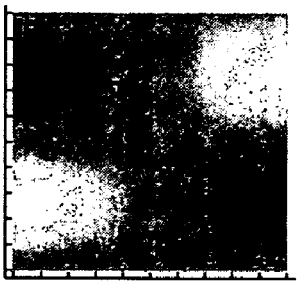
Figure 8:
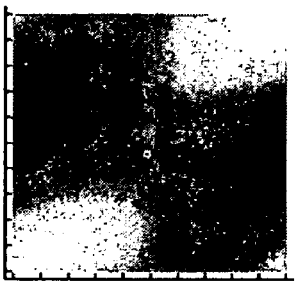
Figure 8:
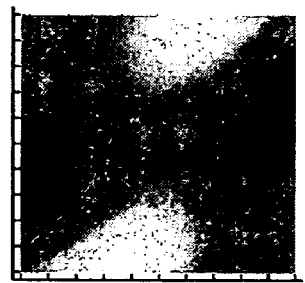
Figure 8:
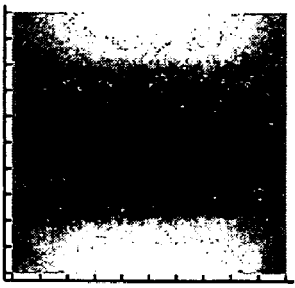
Figure 8:
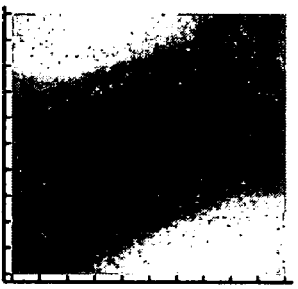
Figure 8:
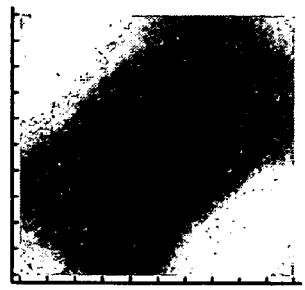

The two-dimensional image model and the SSD self-similarity are shown in FIG. 8.

(1-3) Gaussian Function Model

Figure 9:
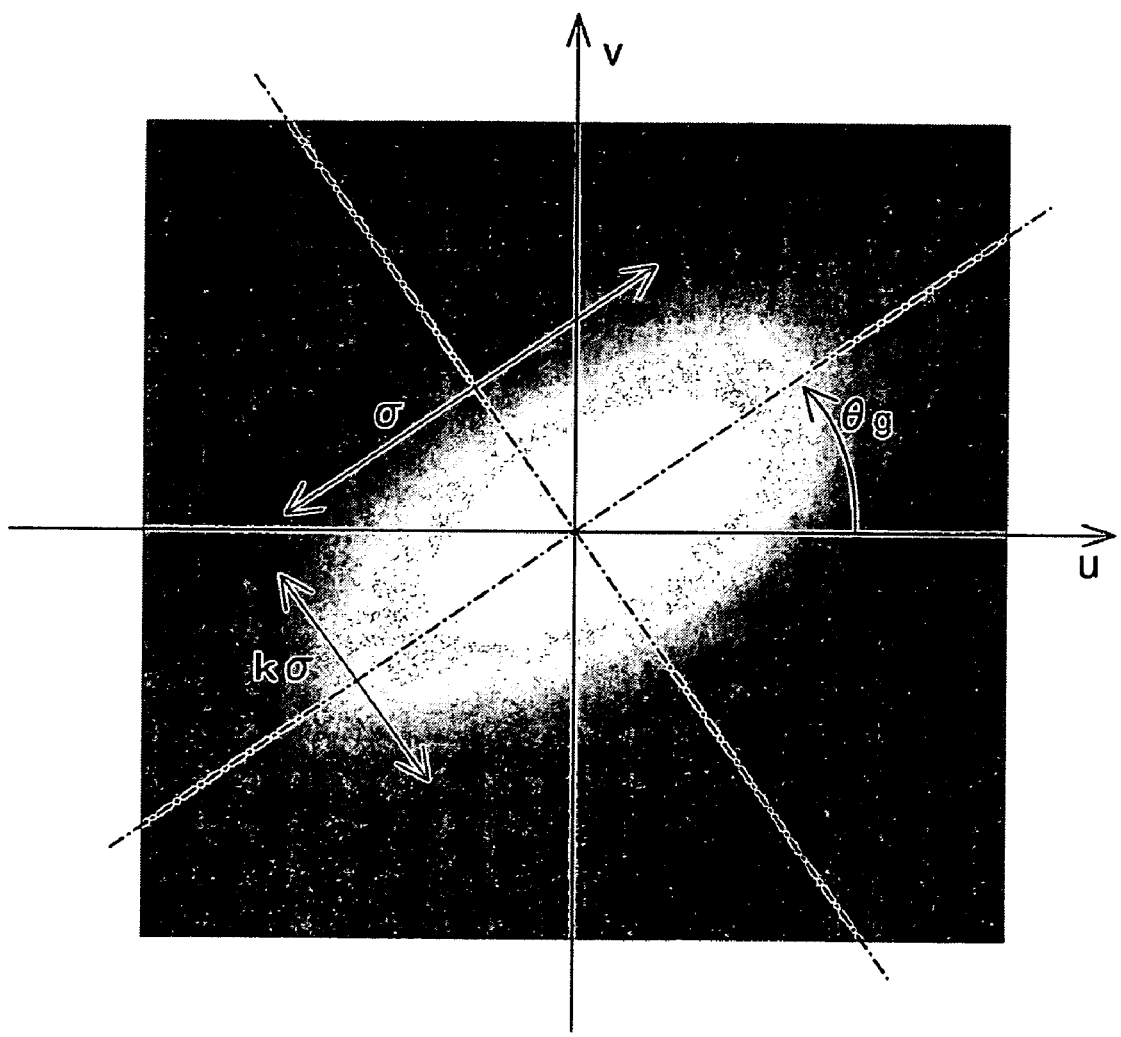
FIG. 9 is a diagram illustrating a two-dimensional Gaussian image model having the rotation angle of the entire image $\theta_g$, the horizontal standard deviation σ, and the vertical standard deviation kσ.
Figure 10:
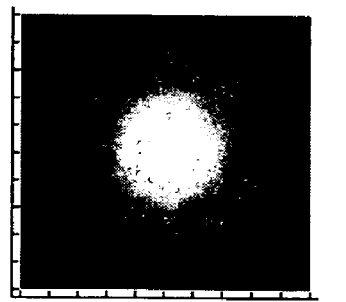
FIG. 10 is a diagram illustrating two-dimensional Gaussian image models and the two-dimensional self-similarity. (a), (b), and (c) show an image model where σ=2, k=1, and $\theta_g$=0, π/8, π/4, respectively. (d), (e), and (f) show similarity corresponding to (a), (b), and (c), respectively. (g), (h), and (i) show an image model where σ=2, k=0.5, and $\theta_g$=0, π/8, π/4, respectively. (j), (k), (l) show similarity corresponding to (g), (h), and (i), respectively. The self-similarity can be obtained from two similar images having constant displacement. The image size is 11×11 [pixel], and the range of similarity is from −5 to 5.
Figure 10:
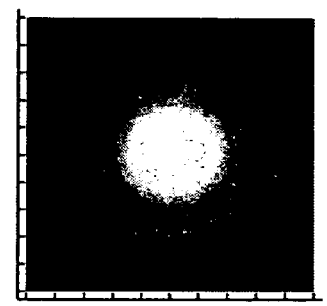
Figure 10:
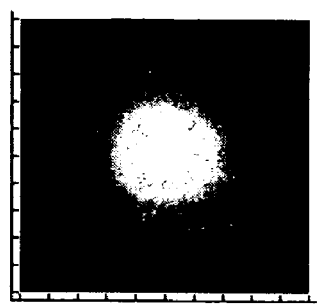

For the two-dimensional image model that causes anisotropy in the self-similarity, a two-dimensional Gaussian function of the following Equation 15 can be considered.

$$I_g(u, v) = \text{gauss}(u\cos(\theta_g) + v\sin(\theta_g), \sigma) \times \quad \text{(Equation 15)}$$
$$\text{gauss}(-u\sin(\theta_g) + v\cos(\theta_g), k\sigma)$$

$$\text{gauss}(x, \sigma) = \frac{1}{\sqrt{2\pi}\,\sigma} e^{-\frac{x^2}{2\sigma^2}}$$

Where as shown in FIG. 9, $\sigma$ is a standard deviation of the Gaussian function, k is the anisotropy coefficient (k>0), $\theta_g$ is the rotation angle. The range of $0 \leq \theta_g \leq \pi/2$ is considered. The two-dimensional image model and the SSD self-similarity are shown in FIG. 10.

(1-4) Two-Dimensional Similarity Model

As different from the one-dimensional subpixel estimation, since the number of parameters is great for the two-dimensional image model in two-dimensional subpixel estimation, it is not advantageous to directly discuss the SSD similarity obtained from the two-dimensional image model. The image model taken here has many image properties, but images for actual applications include an image combining multiple images and higher order images.

Then, in the discussion below, several types of image models are not directly treated. Instead, a two-dimensional similarity model is discussed that the two-dimensional similarity obtained from these image models is approximated. For the two-dimensional similarity model, a two-dimensional Gaussian function expressed by the following Equation 16 is adopted.

$$R_g(s,t,d_s,d_t,\sigma,k,\theta_g) = \text{gauss}((s-d_s)\cos(\theta_g)+(t-d_t)\sin(\theta_g),$$
$$\sigma) \times \text{gauss}(-(s-d_s)\sin(\theta_g)+(t-d_t)\cos(\theta_g),k\sigma) \quad \text{(Equation 16)}$$

Where $(d_s,d_t)$ is the true displacement between images, $\sigma$ is the standard deviation of the Gaussian function, k is the anisotropy coefficient (k>0), $\theta_g$ is the rotation angle. The range of $0 \leq \theta_g \leq \pi/2$ is considered.

Figure 11:
FIG. 11 is a diagram illustrating three types of different two-dimensional image models, the two-dimensional self-similarity, and partial diagrams illustrating two-dimensional self-similarity in comparison with the two-dimensional similarity model. (a) shows a two-dimensional corner image model having $\theta_c$=π/4, $\sigma_{image}$=1, $\theta_g$=0. (b) is a two-dimensional recursive texture image model having $f_u$=0.051, $f_v$=0.1, $\theta_g$=0. (c) is a two-dimensional Gaussian image model having σ=2, k=0.5, $\theta_g$=0. (d), (e), and (f) are similarities corresponding to (a), (b), and (c) respectively. (g), (h), and (i) show horizontal cross-section diagrams of (d), (e), and (f) respectively, sampled at integer positions (denoted by a circle) in t=0, and fitted two-dimensional similarity models (denoted by a dotted line).
Figure 11:
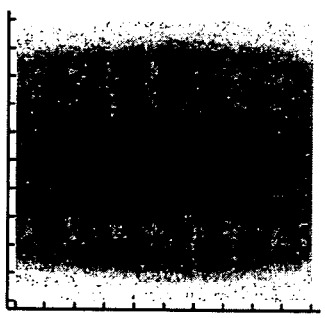
Figure 11:
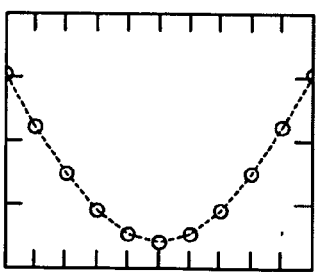
Figure 11:
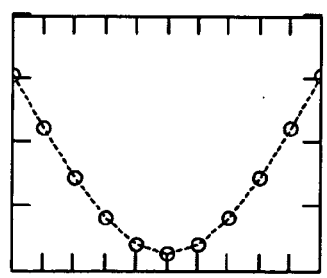
Figure 11:
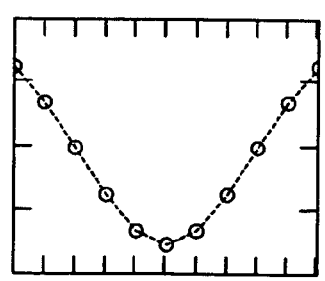

For comparison, examples of the SSD self-similarity obtained from the two-dimensional image model taken here and examples of the similarities of the above Equation 16 are shown in FIG. 11. However, the parameters of the above Equation 16 were determined by numerical computation so that the discrete self-similarities computed from the two-dimensional image model can be most approximated where $(d_s,d_t)=(0,0)$, $\theta_g 0$, k=1.

Figure 12:
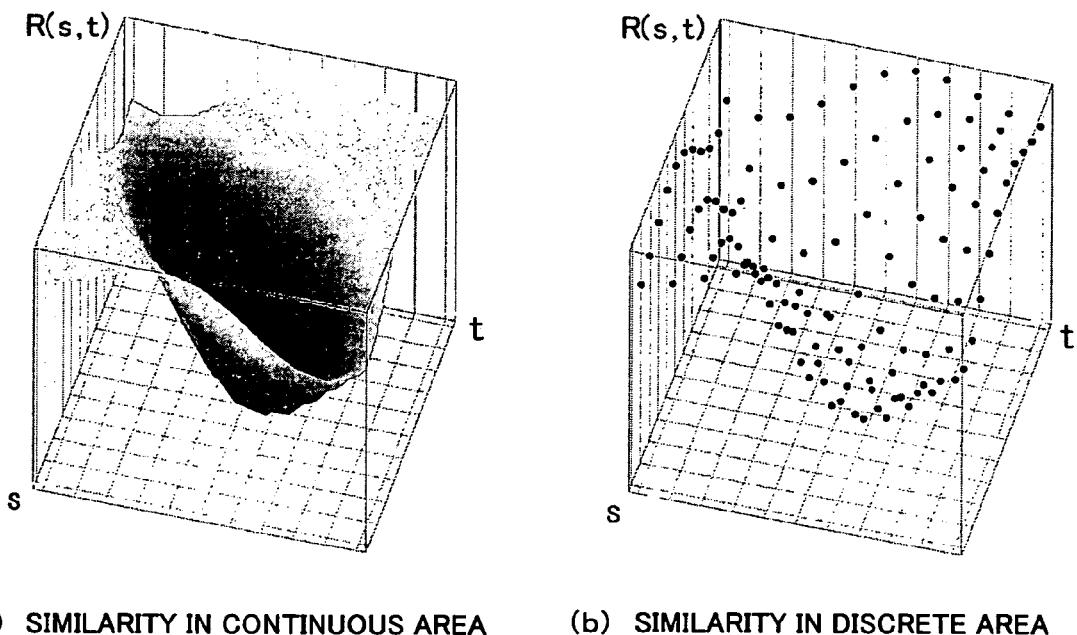
FIG. 12 is a diagram illustrating examples of two-dimensional continuous similarity computation and discrete similarity computation.

The description above has been done in the continuous area, but the similarity obtained from actual image data is sampled in pixels. This manner is shown in FIG. 12. The two-dimensional estimation method of embodiment 1 according to the invention uses the two-dimensional similarity thus obtained in the unit of discretization to highly precisely estimate two-dimensional displacement that gives the maximum similarity value in the continuous area.

(2) Two-Dimensional Estimation Method of Embodiment 1 According to the Invention (2-1) Principles of the Two-Dimensional Estimation Method of Embodiment 1 According to the Invention <Description in the Continuous Area>

Here, the two-dimensional similarity model described above is used to describe the principles of the two-dimensional estimation method of embodiment 1 according to the invention. The invention is characterized in that the similarity value obtained in the unit of discretization is used to highly precisely estimate the maximum similarity value position in the continuous area. Here, the principles of embodiment 1 according to the invention will be described in the continuous area.

Figure 13:
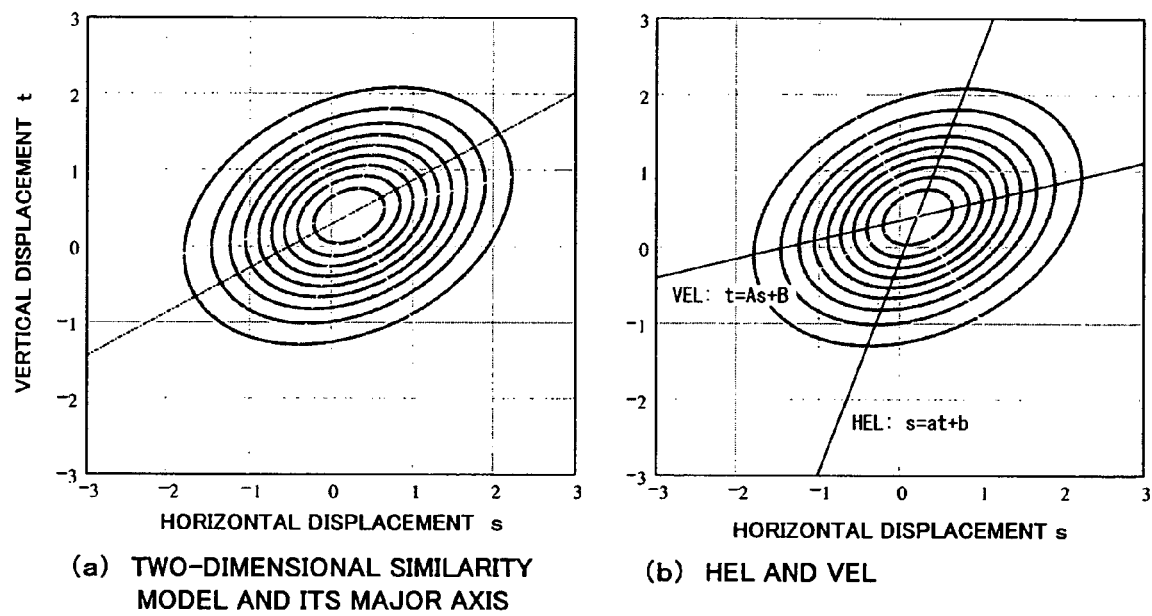
FIG. 13 is a diagram illustrating a two-dimensional similarity model having $(d_s,d_t)$=(0.2,0.4), σ=1, k=0.7, $\theta_g$=π/6. Contour lines correspond to 10 to 90% of the function value. In (a), the major axis of the two-dimensional similarity model represents $\theta_g$=π/6. In (b), both of HEL (horizontal extreme value line) and VEL (vertical extreme value line) pass through the peak value position of the two-dimensional similarity model $(d_s,d_t)$, but they are different from the major axis or the minor axis of the two-dimensional similarity model.

FIG. 13 is diagram illustrating a two-dimensional similarity model by contour lines. Parameters for this two-dimensional similarity model are $(d_s,d_t)=(0.2,0.4)$, $\sigma=1.0$, k=0.7, $\theta_g=\pi/6$. The contour lines show 10 to 90% of levels with respect to the maximum value of the two-dimensional similarity model. The contour lines of the two-dimensional similarity model are ellipses. The center of ellipses is the maximum value position of the two-dimensional similarity model. FIG. 13(a) shows the major axis of the two-dimensional similarity model, and the angle corresponds to the rotation angle $\theta_g$.

The two-dimensional similarity model of Equation 16 is partially differentiated by s to zero, and thus the relationship expressing line s=at+b shown in FIG. 13(b) can be obtained.

$$s = at + b \quad \text{(Equation 17)}$$
$$= \frac{(1-k^2)\sin\theta_g\cos\theta_g}{\sin^2\theta_g + k^2\cos^2\theta_g} t +$$
$$d_s - \frac{(1-k^2)\sin\theta_g\cos\theta_g}{\sin^2\theta_g + k^2\cos^2\theta_g} d_t$$

Since the condition to be considered is k>0, the denominator for each coefficient of the above Equation 17 $\neq 0$. Furthermore, when the two-dimensional similarity model has isotropy, that is, when k=1, the above Equation 17 becomes $s=d_s$, and no estimation error occurs. In embodiment 1 according to the invention, this line is called a horizontal extreme value line HEL (Horizontal Extremal Line). HEL passes through the contact point of the ellipses showing the contour lines with the horizontal line in FIG. 13(b).

On the other hand, the two-dimensional similarity model of Equation 16 is partially differentiated by t to zero, and thus the relationship expressing line t=As+B in FIG. 13(b) can be obtained.

$$t = As + B \quad \text{(Equation 18)}$$
$$= \frac{(1-k^2)\sin\theta_g\cos\theta_g}{k^2\sin^2\theta_g + \cos^2\theta_g} s +$$
$$d_t - \frac{(1-k^2)\sin\theta_g\cos\theta_g}{k^2\sin^2\theta_g + \cos^2\theta_g} d_s$$

As similar to Equation 17, the denominator for each coefficient $\neq 0$. Moreover, Equation 18 is $t=d_t$ when k=1, and no estimation error occurs. In embodiment 1 according to the invention, this line is called a vertical extreme value line VEL (Vertical Extremal Line). VEL passes through the contact point of the ellipses showing the contour lines with the vertical line in FIG. 13(b).

The intersection point of HEL and VEL is the point that is zero in any directions when the two-dimensional similarity model of Equation 16 is partially differentiated in different directions. It is the position that makes the similarity value of the two-dimensional similarity model the maximum. In fact, the intersection point is computed as:

$$s = \frac{aB+b}{1-aA} = d_s \quad \text{(Equation 19)}$$

$$t = \frac{Ab+B}{1-aA} = d_t$$

Of course, it represents the displacement $(d_s, d_t)$ of the two-dimensional similarity model.

The denominator at this time $\neq 0$ is the condition for the intersection point held by HEL and VEL. When the denominator is computed, it is as follows:

$$1 - aA = 1 - \frac{(1-k^2)\sin\theta_g \cos\theta_g}{\sin^2\theta_g + k^2\cos^2\theta_g} \times \quad \text{(Equation 20)}$$

$$\frac{(1-k^2)\sin\theta_g \cos\theta_g}{k^2\sin^2\theta_g + \cos^2\theta_g}$$

$$= \frac{k^2}{(\sin^2\theta_g + k^2\cos^2\theta_g)(k^2\sin^2\theta_g + \cos^2\theta_g)}$$

Since the range of k is k>0, the denominator is $1-aA \neq 0$.

In summary, the s-direction differential and the t-direction differential of the two-dimensional similarity can be expressed by two lines, HEL and VEL, and the intersection point of the two lines is the maximum value position of the two-dimensional similarity. Therefore, in embodiment 1 according to the invention, the similarity value obtained in the unit of discretization is used to determine HEL and VEL, and the intersection point is computed. Thus, the two-dimensional subpixel estimation can be conducted.

(2-2) Implementing Method of the Two-Dimensional Estimation Method of Embodiment 1 According to the Invention
<Application to the Discrete Area>

Hereinafter, the two-dimensional estimation method of embodiment 1 according to the invention will be described more specifically, which the similarity value between images discretely computed is used to estimate the maximum similarity value position in the continuous area.

Figure 14:
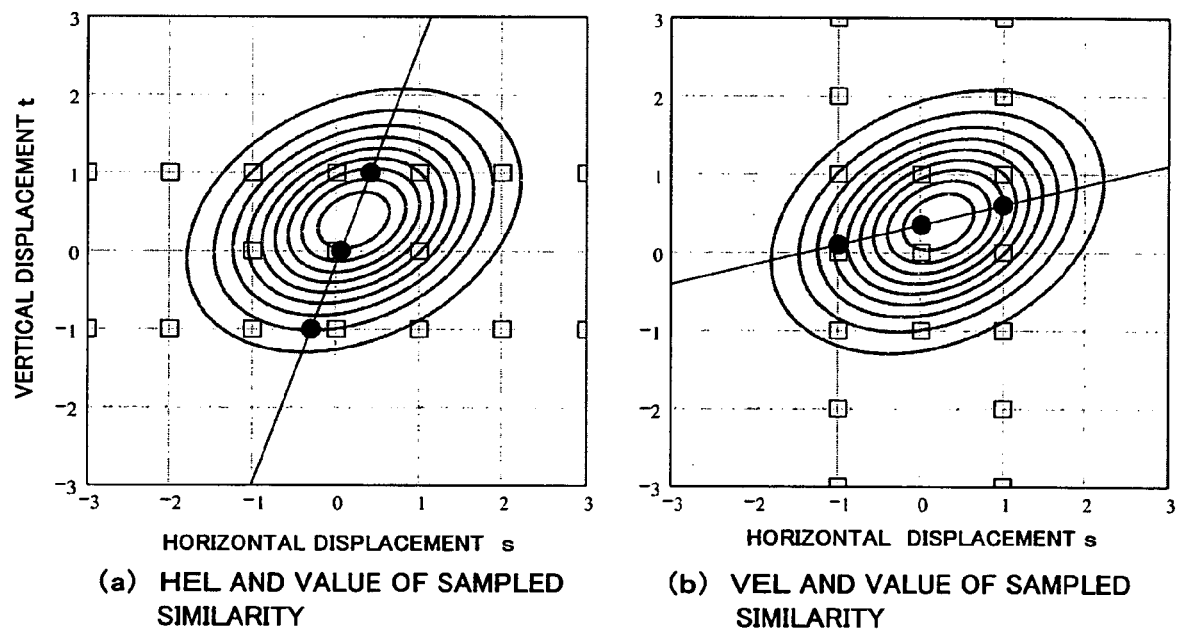
FIG. 14 is a illustrative diagram of HEL and VEL estimation processes. In (a), black circles denote estimated subpixel positions obtained from the similarity value (square) of three horizontal lines t=−1, t=0, t=1, and HEL is the minimum square and can be estimated from the positions of three black circles. In (b), VEL can be estimated by the similar process.

First, the similarity value discretely obtained is used to determine HEL. Since HEL is the line passing through the maximum similarity value in the horizontal direction, HEL can be determined when the maximum similarity value position in subpixels is determined on two or more of horizontal lines. This manner is shown in FIG. 14(a). Concentric ellipses represent contour lines of a two-dimensional similarity model. The similarity value discretely obtained at square positions is used to determine HEL shown in a line.

In FIG. 14(a), suppose the position that gives the maximum similarity on line t=0 is $(d_{s(t=0)}, 0)$, and the similarity at the displacement position (s,t) is R(s,t).

$$\hat{d}_{s(t=0)} = \frac{R(-1, 0) - R(1, 0)}{2R(-1, 0) - 4R(0, 0) + 2R(1, 0)} \quad \text{(Equation 21)}$$

The estimation result includes estimation error as described in the chapter above, and this will be described in subsequent chapter. Suppose the positions that give the maximum similarity on line t=−1 and line t=1 are $(\hat{d}_{s(t=-1)}, -1)$, and $(\hat{d}_{s(t=1)}, 1)$.

$$\hat{d}_{s(t=-1)} = \frac{R(-1+i_{t=-1}, -1) - R(1+i_{t=-1}, -1)}{2R(-1+i_{t=-1}, -1) - } + i_{t=-1} \quad \text{(Equation 22)}$$

$$4R(i_{t=-1}, -1) + 2R(1+i_{t=-1}, -1)$$

$$\hat{d}_{s(t=1)} = \frac{R(-1+i_{t=1}, 1) - R(1+i_{t=1}, 1)}{2R(-1+i_{t=1}, 1) - 4R(i_{t=1}, 1) + } + i_{t=1} \quad \text{(Equation 23)}$$

$$2R(1+i_{t=1}, 1)$$

Where $i_{t=-1}$, $i_{t=1}$ are integer position offsets that give the maximum similarity on line t=−1 and line t=1 (described later).

The line that passes through the maximum similarity positions on these three points is HEL. In fact, because of image patterns, noise contained in images, and differences between images, there is the possibility that these three points are not on the line completely, and thus the approximate line is determined by the minimum square. The line that approximates these three points by the minimum square can be determined by the following Equation 24.

$$s = at + b \quad \text{(Equation 24)}$$

$$a = \frac{1}{2}(\hat{d}_{s(t=1)} - \hat{d}_{s(t=-1)})$$

$$b = \frac{1}{3}(\hat{d}_{s(t=1)} + \hat{d}_{s(t=0)} + \hat{d}_{s(t=-1)})$$

Subsequently, the similarity value obtained in the unit of discretization is used to determine VEL. Since VEL is the line that passes through the maximum similarity value in the vertical direction, VEL can be determined when the maximum similarity value position in subpixel is determined on two or more vertical lines. This manner is shown in FIG. 14(b). The concentric ellipses represent the contour lines of the two-dimensional similarity model. The similarity value obtained at square positions in the unit of discretization is used to determine VEL showed by a line.

In FIG. 14(b), suppose the position that gives the maximum similarity on line s=0 is $(0, \hat{d}_{t(s=0)})$.

$$\hat{d}_{t(s=0)} = \frac{R(0, -1) - R(0, 1)}{2R(0, -1) - 4R(0, 0) + 2R(0, 1)} \quad \text{(Equation 25)}$$

Suppose the positions that give the maximum similarity on line s=−1 and line s=1 are $(-1, \hat{d}_{t(s=-1)})$, $(1, \hat{d}_{t(s=1)})$, respectively.

$$\hat{d}_{t(s=-1)} = \frac{R(-1, -1+i_{s=-1}) - R(-1, 1+i_{s=-1})}{2R(-1, -1+i_{s=-1}) - } + i_{s=-1} \quad \text{(Equation 26)}$$

$$4R(-1, i_{s=-1}) + 2R(-1, 1+i_{s=-1})$$

$$\hat{d}_{t(s=1)} = \frac{R(1, -1+i_{s=1}) - R(1, 1+i_{s=1})}{2R(1, -1+i_{s=1}) - 4R(1, i_{s=1}) + } + i_{s=1} \quad \text{(Equation 27)}$$

$$2R(1, 1+i_{s=1})$$

Where $i_{s=-1}$, and $i_{s=1}$ are integer position offsets that give the maximum similarity on line s=−1 and line s=1.

The line that passes through these three maximum similarity positions is VEL. The line that approximates these three points by the minimum square can be determined by the following Equation 28.

$$t = As + B \qquad \text{(Equation 28)}$$
$$A = \frac{1}{2}(\hat{d}_{t(s=1)} - \hat{d}_{t(s=-1)})$$
$$B = \frac{1}{3}(\hat{d}_{t(s=1)} + \hat{d}_{t(s=0)} + \hat{d}_{t(s=-1)})$$

The intersection point of HEL and VEL, that is, the intersection point of Equation 24 and Equation 28 is the subpixel estimation position $(\tilde{d}_s, \tilde{d}_t)$ of the maximum two-dimensional similarity value in a continuous area.

$$\tilde{d}_s = \frac{aB + b}{1 - aA} \qquad \text{(Equation 29)}$$
$$\tilde{d}_t = \frac{Ab + B}{1 - aA}$$

Figure 15:
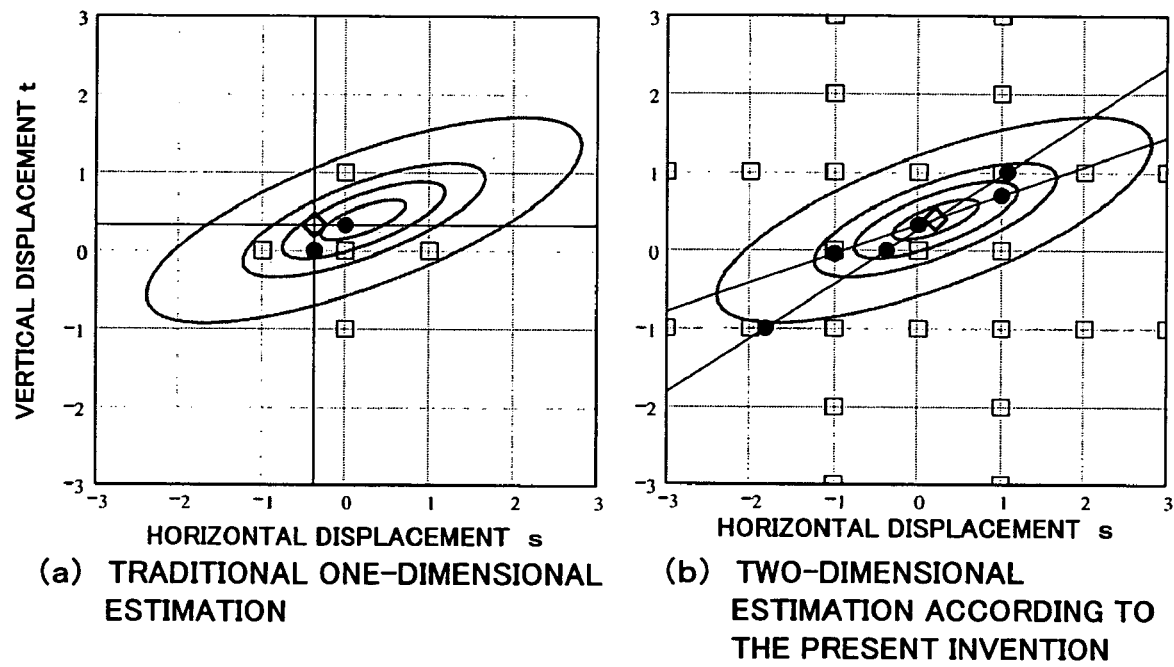
FIG. 15 is a diagram illustrating positions of the similarity values required for the traditional one-dimensional estimation method and the two-dimensional estimation method of embodiment 1 according to the invention. The two-dimensional similarity model has $(d_s,d_t)$=(0.2,0.4), σ=1, k=0.3, $\theta_g$=π/8.

However, the integer position offsets $i_{t=-1}$, $i_{t=1}$ that give the maximum similarity on line t=-1 and line t=1 in Equation 26 and Equation 27 are not assured that they always become zero. For example, the model shown in FIG. 15(b) is a two-dimensional similarity model of $(d_s,d_t)$=(0.2,0.4), $\sigma$=1, k=0.3, $\theta_g=\pi/8$, and the maximum similarity value on line t=-1 for determining HEL with respect to this model is near s=-2. Therefore, when $\hat{d}_{s(t=-1)}$, $\hat{d}_{s(t=1)}$ are computed, it is necessary to again search integer positions that give the maximum similarity on line t=-1 and line t=1. It is the same in the vertical direction. When $\hat{d}_{t(s=-1)}$, $\hat{d}_{t(s=1)}$ are computed, it is necessary to again search integer positions that give the maximum similarity on line s=-1 and line s=1.

At this time, the similarity in the range of ±3 shown in FIG. 15(b) is used to consider $-2 \leq i \leq +2$. The search area is the range that is determined based on may realistic images. Suppose there are no limits on the range of parameters for the two-dimensional similarity model, the area to be searched again at this time can be infinite. The reason is as follows. Suppose $D(k,\theta_g)$ of the following Equation 30 is considered on HEL of Equation 17 when $(d_s,d_t)$=(0,0).

$$2D(k, \theta_g) = \hat{d}_{s(t=1)} - \hat{d}_{s(t=-1)} \qquad \text{(Equation 30)}$$
$$= 2a$$
$$= 2\frac{(1 - k^2)\sin\theta_g\cos\theta_g}{\sin^2\theta_g + k^2\cos^2\theta_g}$$

$D(k, \theta_g)$ comes close to the maximum value when $\theta_g \to 0$, $k \to 0$, because $D(k,\theta_g) \to \cos\theta_g/\sin\theta_g \to \infty$. In the mean time, the anisotropy of the two-dimensional similarity is infinite when $k \to 0$, and HEL and VEL are almost matched. Even though there is an image that can create such two-dimensional similarity, it is fine to search the maximum similarity value on HEL and VEL that are almost matched. For example, it is fine that the similarity values on three points on VEL, $(-1, \hat{d}_{t(s=-1)})$, $(0,\hat{d}_{t(s=0)})$, $(1,\hat{d}_{t(s=1)})$ are determined for parabolic fitting when $D(k,\theta_g) \to \infty$ in Equation 30.

In traditional one-dimensional estimation, five similarity values shown in FIG. 15(a) are used to estimate subpixel positions. At this time, the similarity at three points (squares) on line t=0 are used to conduct subpixel estimation for the horizontal direction subpixel displacement (black circles). Furthermore, the similarity at three points (squares) on line s=0 are used to conduct subpixel estimation for subpixel displacement in the vertical direction (black circles). The intersection point of two lines shown in FIG. 15(a) is the two-dimensional subpixel estimation value determined by the traditional method, and it is revealed that a great estimation error is included.

On the other hand, in the two-dimensional estimation method of embodiment 1 according to the invention, 25 similarity values shown in FIG. 15(b) are used to estimate two-dimensional subpixel positions. Since the intersection point of HEL and VEL passes through the subpixel maximum position of the two-dimensional similarity accurately, estimation is highly precise. Moreover, an increase in the amount of computation in the two-dimensional estimation method of embodiment 1 according to the invention is smaller than that in the traditional "one-dimensional estimation method". In region-based matching, the similarity value is computed for most of computation time, but an in crease in computation time is small in the two-dimensional estimation method of embodiment 1 according to the invention because the similarity value already obtained is used.

(2-3) Combination of the Two-Dimensional Estimation Method of Embodiment 1 According to the Invention with a Subpixel Estimation Error Reduction Method In Equation 21 to Equation 23, and Equation 25 to Equation 27, when the similarity at three positions is used to estimate subpixel positions by parabolic fitting, estimation error is generated. The estimation error can be cancelled by using an interpolation image.

The subpixel position to be determined in Equation 21 to Equation 23 and Equation 25 to Equation 27 is only one-dimensional estimation in traditional ways. Therefore, a subpixel estimation method described in NONPATENT LITERATURE 1, which can reduce estimation error, can be applied as it is (hereinafter, in order to distinguish from the two-dimensional estimation method of embodiment 1 according to the invention, a subpixel estimation method described in NONPATENT LITERATURE 1 is called a "subpixel estimation error reduction method") Here, the application method will be described in brief.

When a two-dimensional image function used for matching is $I_1(u,v)$, $I_2(u,v)$, a horizontal interpolation image $I_{1iu}(u, v)$ can be expressed as:

$$I_{1iu}(u, v) = \frac{1}{2}(I_1(u - 1, v) + I_1(u, v)) \qquad \text{(Equation 31)}$$

Where (u,v), at this time is integers. It can be considered that the horizontal interpolation image $I_{1iu}(u,v)$ is displaced by (0.5,0) with respect to $I_1(u,v)$. When this interpolation image is used to conduct subpixel estimation in SSD similarity shown below, it can be considered that the estimation result is also displaced by (0.5,0). Thus, the estimation result that has corrected the displacement can be determined by the following Equation 32 and Equation 33.

$$R_{iu}(s, t) = \sum_{i,j \in W} (I_{1iu}(i, j) - I_2(i+s, j+t))^2 \qquad \text{(Equation 32)}$$

$$\hat{d}_{is(t=0)} = \frac{R_{iu}(-1, 0) - R_{iu}(1, 0)}{2R_{iu}(-1, 0) - 4R_{iu}(0, 0) + 2R_{iu}(1, 0)} - 0.5 \qquad \text{(Equation 33)}$$

Although Equation 33 also includes estimation error as Equation 21 does, its phase is inverted. Thus, the estimation error can be cancelled by the following Equation 34.

$$\tilde{d}_{s(t=0)} = \frac{1}{2}(\hat{d}_{s(t=0)} + \hat{d}_{is(t=0)}) \qquad \text{(Equation 34)}$$

Similarly, for horizontal line t=−1, t=1:

$$\hat{d}_{is(t=-1)} = \frac{R_{iu}(-1+i_{t=-1}, -1) - R_{iu}(1+i_{t=-1}, -1)}{2R_{iu}(-1+i_{t=-1}, -1) - 4R_{iu}(i_{t=-1}, -1) + 2R_{iu}(1+i_{t=-1}, -1)} + i_{t=-1} - 0.5 \qquad \text{(Equation 35)}$$

$$\hat{d}_{is(t=1)} = \frac{R_{iu}(-1+i_{t=1}, 1) - R_{iu}(1+i_{t=1}, 1)}{2R_{iu}(-1+i_{t=1}, 1) - 4R_{iu}(i_{t=1}, 1) + 2R_{iu}(1+i_{t=1}, 1)} + i_{t=1} - 0.5 \qquad \text{(Equation 36)}$$

Where $i_{t=-1}$, $i_{t=1}$ are integer position offsets that give the maximum similarity $R_{iu}(s,t)$ on line t=−1 and line t=1. These values are likely to be different from Equation 22 and Equation 23. Equation 35 and Equation 36 are used to cancel estimation error by the following Equation 37 and Equation 38.

$$\tilde{d}_{s(t=-1)} = \frac{1}{2}(\hat{d}_{s(t=-1)} + \hat{d}_{is(t=-1)}) \qquad \text{(Equation 37)}$$

-continued $$\tilde{d}_{s(t=1)} = \frac{1}{2}(\hat{d}_{s(t=1)} + \hat{d}_{is(t=1)}) \qquad \text{(Equation 38)}$$

It is similar in the vertical direction. A vertical interpolation image $I_{1iv}(u,v)$ can be expressed as:

$$I_{1iv}(u, v) = \frac{1}{2}(I_1(u, v-1) + I_1(u, v)) \qquad \text{(Equation 39)}$$

Where (u,v) at this time are integers. It can be considered that the vertical interpolation image $I_{1iv}(u,v)$ is displaced only by (0,0.5) with respect to $I_1(u,v)$. When this interpolation image is used to conduct subpixel estimation in SSD similarity, it can be considered that the estimation result is also displaced by (0,0.5). Thus, the estimation result that has corrected the displacement can be determined by the following Equation 40 and Equation 41.

$$R_{iv}(s, t) = \sum_{i,j \in W} (I_{1iv}(i, j) - I_2(i+s, j+t))^2 \qquad \text{(Equation 40)}$$

$$\hat{d}_{it(s=0)} = \frac{R_{iv}(0, -1) - R_{iv}(0, 1)}{2R_{iv}(0, -1) - 4R_{iv}(0, 0) + 2R_{iv}(0, 1)} - 0.5 \qquad \text{(Equation 41)}$$

Although Equation 41 also includes estimation error as Equation 25 does, its phase is inverted. Therefore, the estimation error can be cancelled by the following Equation 42.

$$\tilde{d}_{t(s=0)} = \frac{1}{2}(\hat{d}_{t(s=0)} + \hat{d}_{it(s=0)}) \qquad \text{(Equation 42)}$$

Similarly, for vertical lines s=−1, s=1:

$$\hat{d}_{it(s=-1)} = \frac{R_{iv}(-1, -1+i_{s=-1}) - R_{iv}(-1, 1+i_{s=-1})}{2R_{iv}(-1, -1+i_{s=-1}) - 4R_{iv}(-1, i_{s=-1}) + 2R_{iv}(-1, 1+i_{s=-1})} + i_{s=-1} - 0.5 \qquad \text{(Equation 43)}$$

$$\hat{d}_{it(s=1)} = \frac{R_{iv}(1, -1+i_{s=1}) - R_{iv}(1, 1+i_{s=1})}{2R_{iv}(1, -1+i_{s=1}) - 4R_{iv}(1, i_{s=1}) + 2R_{iv}(1, 1+i_{s=1})} + i_{s=1} - 0.5 \qquad \text{(Equation 44)}$$

Where $i_{s=-1}$, $i_{s=1}$ are integer position offsets that give the maximum similarity $R_{iv}(s,t)$ on line s=−1 and line s=1.

These values are likely to be different from Equation 26 and Equation 27. Equation 43 and Equation 44 can be used to cancel estimation error by the following Equation 45 and Equation 46.

$$\tilde{d}_{t(s=-1)} = \frac{1}{2}(\hat{d}_{t(s=-1)} + \hat{d}_{it(s=-1)}) \qquad \text{(Equation 45)}$$

$$\tilde{d}_{t(s=1)} = \frac{1}{2}(\hat{d}_{t(s=1)} + \hat{d}_{it(s=1)}) \qquad \text{(Equation 46)}$$

The subpixel estimation value on each line computed by Equation 34, Equation 37, Equation 38, Equation 42, Equation 45, and Equation 46 is reduced in estimation error more than that in the subpixel estimation value of the traditional one-dimensional estimation method. Therefore, the estimation result estimated by the subpixel estimation error reduction method is used to further conduct two-dimensional subpixel estimation by the two-dimensional estimation method of embodiment 1 according to the invention, and thus two-dimensional subpixel estimation can be conducted more highly precisely.

$$\bar{d}_s = \frac{\bar{a}\bar{B} + \bar{b}}{1 - \bar{a}\bar{A}} \quad \text{(Equation 47)}$$

$$\bar{d}_t = \frac{\bar{A}\bar{b} + \bar{B}}{1 - \bar{a}\bar{A}}$$

$$\bar{a} = \frac{1}{2}(\tilde{d}_{s(t=1)} - \tilde{d}_{s(t=-1)})$$

$$\bar{b} = \frac{1}{3}(\tilde{d}_{s(t=1)} + \tilde{d}_{s(t=0)} + \tilde{d}_{s(t=-1)})$$

$$\bar{A} = \frac{1}{2}(\tilde{d}_{t(s=1)} - \tilde{d}_{t(s=-1)})$$

$$\bar{B} = \frac{1}{3}(\tilde{d}_{t(s=1)} + \tilde{d}_{t(s=0)} + \tilde{d}_{t(s=-1)})$$

Since it is fine that an interpolation image is created at one time each in the horizontal direction and in the vertical direction, an increase in the amount of computation is almost the same as that in the one-dimensional estimation.

(3) Comparison of Estimation Error by the Two-Dimensional Estimation Method of Embodiment 1 According to the Invention with Estimation Error by the Traditional Estimation Method Hereinafter, for two-dimensional displacement between images estimation, estimation error by various estimation methods traditionally, generally used is compared with estimation error by the two-dimensional estimation method of embodiment 1 according to the invention. The two-dimensional image described above is used to compare estimation error for comparison with respect to the same image.

For two-dimensional subpixel estimation error, it is necessary to consider estimation error in the horizontal direction and in the vertical direction. However, estimation error is influenced by five parameters in total of three parameters in a two-dimensional image and two-dimensional input displacements between images, and thus it is difficult to cover entirely. Then, a typical two-dimensional image is used to compare estimation error by each method.

(3-1) Two-Dimensional Estimation Method of Embodiment 1 According to the Invention The corner image described above is used as a typical two-dimensional image, and consider parameters as $\theta_g=0,\pi/8,\pi/4$, $\theta_c=\pi/4$, $\sigma_{image}=1.0$. The two-dimensional image other than $0 \leq \theta_g \leq \pi/4$ can be expressed by inverting the image left to right and inverting shadings. However, the actual study is conducted by using a great number of two-dimensional images, the rotation angle, and the corner angle. Also in the other two-dimensional images, subpixel estimation error shows the same tendency when the two-dimensional similarity takes similar forms.

The horizontal estimation error errors and the vertical estimation error $error_t$ in the two-dimensional subpixel estimation method of embodiment 1 according to the invention to which the subpixel estimation error reduction method is adapted can be expressed by the following Equation 48 with the use of Equation 47.

$$error_s = \bar{d}_s - d_s$$

$$error_t = \bar{d}_t - d_t \quad \text{(Equation 48)}$$

The horizontal estimation error $error_s$ and the vertical estimation error $error_t$ in the two-dimensional subpixel estimation method of embodiment 1 according to the invention to which the subpixel estimation error reduction method is not adapted can be expressed by the following Equation 49 with the use of Equation 29.

$$error_s = \tilde{d}_s - d_s$$

$$error_t = \tilde{d}_t - d_t \quad \text{(Equation 49)}$$

Figure 16:
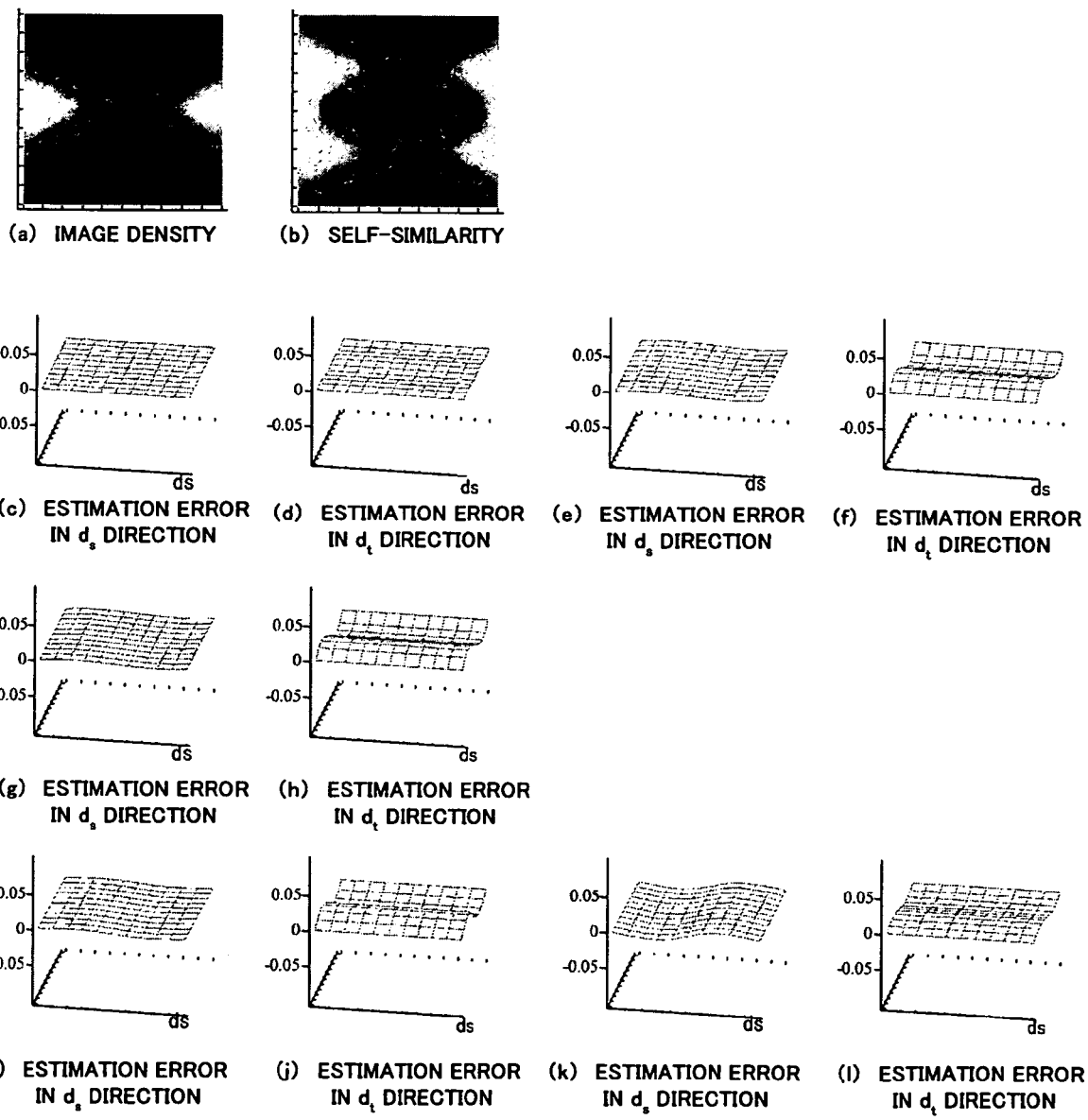
FIG. 16 is a diagram for comparing estimation errors. (a) shows an image model used for comparison, that is, a two-dimensional corner model for $\theta_g$=0, $\theta_c$=π/4, $\sigma_{image}$=1.0. (b) shows the self-similarity of the image model (a).
Figure 17:
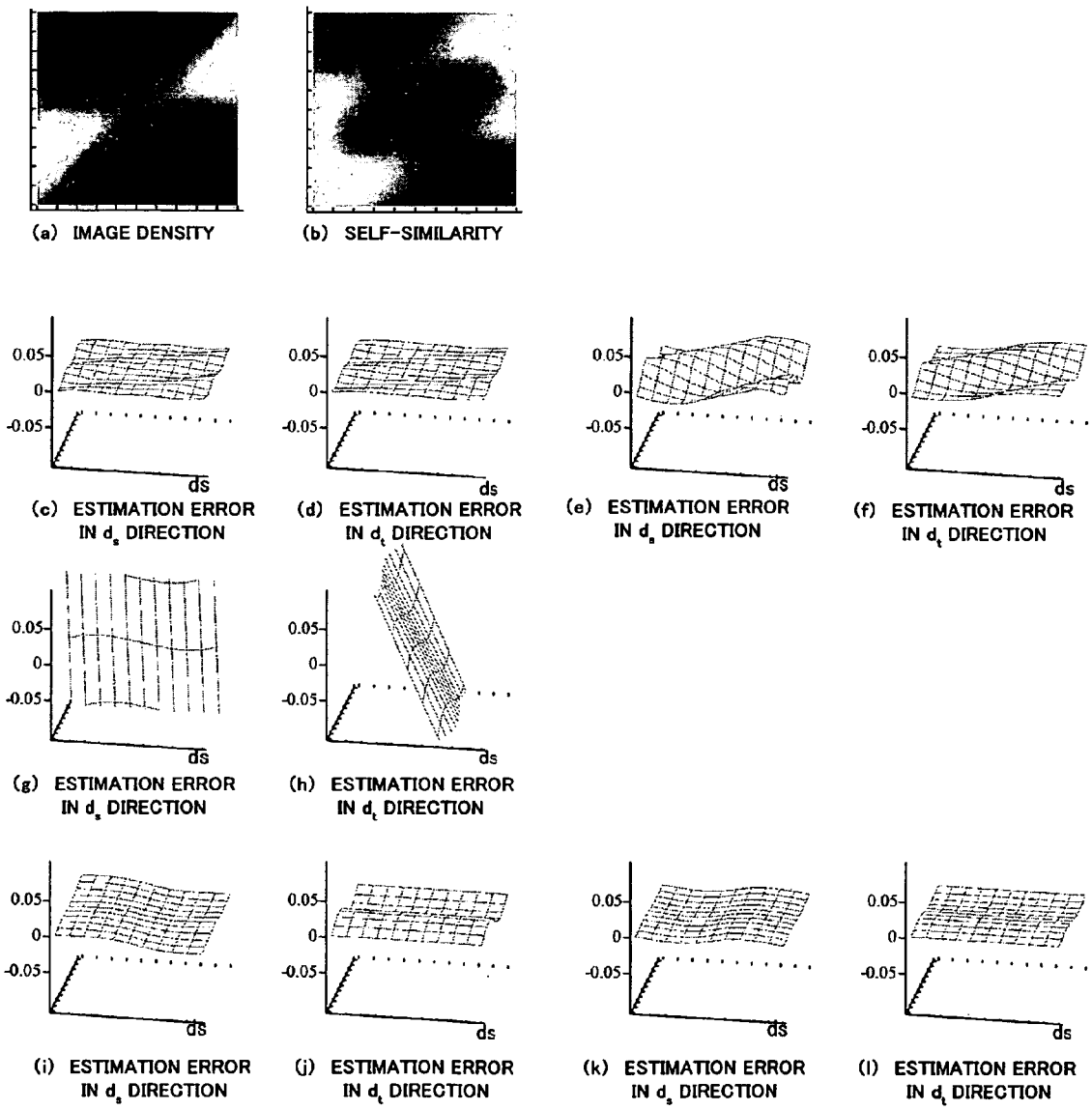
FIG. 17 is a diagram for comparing estimation errors. (a) shows an image model used for comparison, that is, a two-dimensional corner model for $\theta_g$=π/8, $\theta_c$=π/4, $\sigma_{image}$=1.0. (b) shows the self-similarity of the image model (a).
Figure 18:
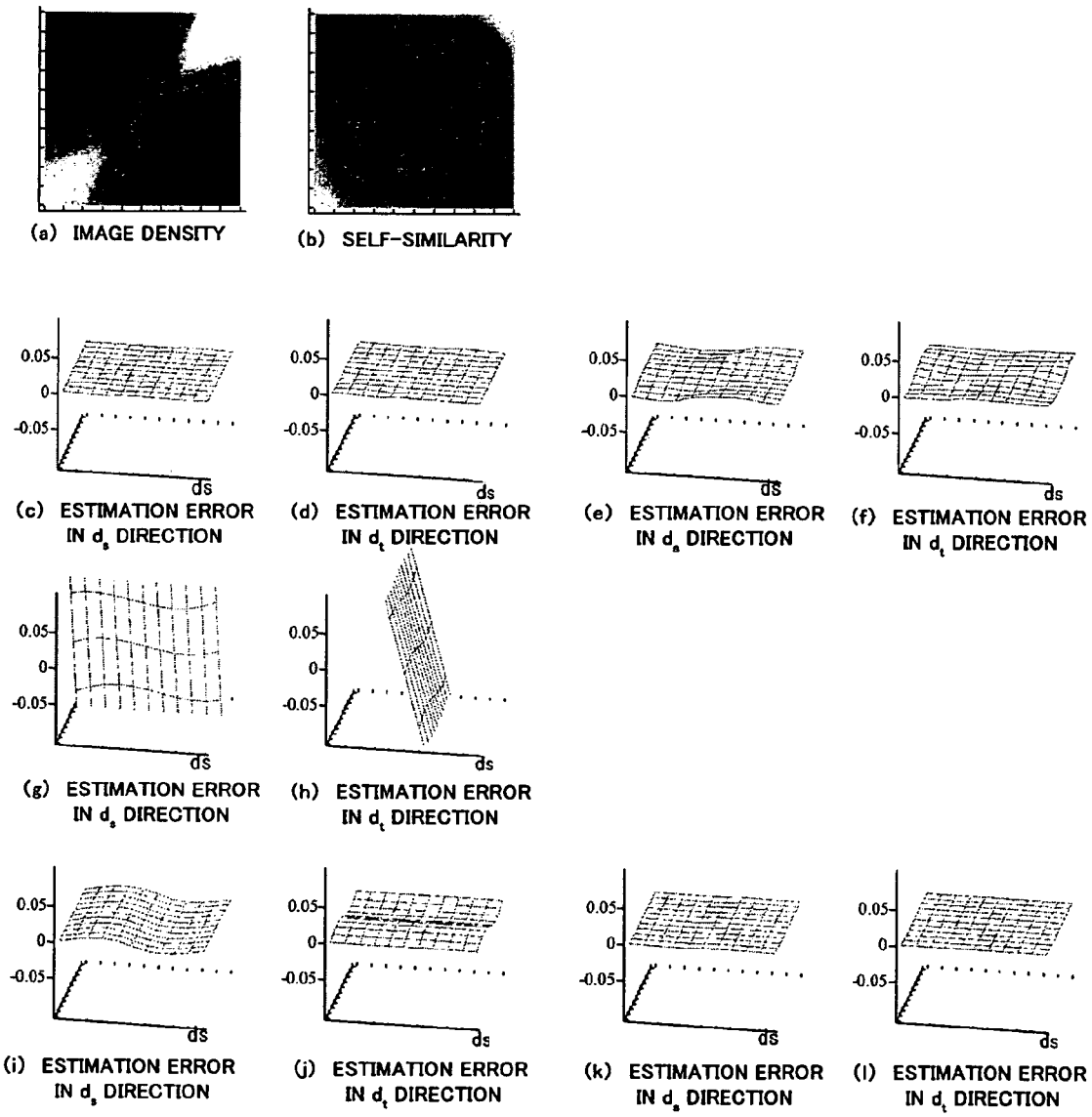
FIG. 18 is a diagram for comparing estimation errors. (a) shows an image model used for comparison, that is, a two-dimensional corner model for $\theta_g$=π/4, $\theta_c$=π/4, $\sigma_{image}$=1.0. (b) shows the self-similarity of the image model (a).

The two-dimensional subpixel estimation errors of Equation 48 and Equation 49 with respect to three images, $\theta_g=0$, $\pi/8, \pi/4$ are shown in (c) and (d), and (e) and (f) in FIGS. 16, 17, and 18, respectively. (c) and (d) show the horizontal estimation error $error_s$ and the vertical estimation error $error_t$ in the two-dimensional subpixel estimation method of embodiment 1 according to the invention to which the subpixel estimation error reduction method is adapted, respectively. (e) and (f) show the horizontal estimation error $error_s$ and the vertical estimation error $error_t$ in the two-dimensional subpixel estimation method of embodiment 1 according to the invention to which the subpixel estimation error reduction method is not adapted, respectively.

FIG. 16 shows the result using the image $\theta_g=0$, but no anisotropy occurs in the two-dimensional similarity at this time. FIGS. 17 and 18 show the results using the mages $\theta_g=\pi/8$ and $\pi/4$, and subpixel estimation error is significantly small in spite of anisotropy in the two-dimensional similarity at this time.

(3-2) Traditional One-Dimensional Subpixel Estimation Method

The traditional one-dimensional estimation method can be determined by Equation 21 and Equation 25. Furthermore, the estimated value to which the subpixel estimation error reduction method described in NONPATENT LITERATURE 1 is adapted can be determined by Equation 34 and Equation 42. Here, the estimation error is compared and discussed when Equation 21 and Equation 25 are used.

$$error_s = d_{s(t=0)} - d_s$$

$$error_t = d_{t(s=0)} - d_t \quad \text{(Equation 50)}$$

The subpixel estimation errors of the above Equation 50 with respect to three images $\theta_g=0, \pi/8, \pi/4$ are shown in (g) and (h) in FIGS. 16, 17, and 18. (g) and (h) show the horizontal estimation error $error_s$ and the vertical estimation error $error_t$ in the traditional one-dimensional estimation method, respectively.

Although FIG. 16 shows the results using the image $\theta_g=0$, no anisotropy occurs in the two-dimensional similarity at this time. At this time, no estimation error is generated even by the traditional one-dimensional estimation method. FIGS. 17 and 18 show the results using the images $\theta_g=\pi/8$ and $\pi/4$, respectively, and anisotropy occurs in the two-dimensional similarity at this time. At this time, a great estimation error is generated. The size of estimation error depends on the rotation angle of two-dimensional similarity having anisotropy and true displacement between images.

(3-3) Subpixel Estimation by a Traditional Gradient-Based Method

In a gradient-based method, suppose there is no density variation at correspondence positions between images, and constraint conditions including two unknowns in a horizontal displacement and in a vertical displacement are obtained for every pixel. Therefore, since these two unknowns cannot be determined as they are, a focused area is set to determine the unknowns by recursive computation so that the sum of squares of a constraint condition is the minimum in the focused area. The amount of displacement thus obtained has no constraints of the unit of pixels, and a unit of subpixels can be obtained.

On the other hand, in an image interpolation method, the focused area and the search area therearound are densely interpolated more than in the unit of discretization. The maximum similarity value is searched in the unit densely interpolated. At this time, as different from the gradient-based method, there is no limit on a displacement between images.

These two types of subpixel displacement estimation methods seem to be completely different in implementing, and are treated as different methods. However, it is revealed that they are substantially the same (see NONPATENT LITERATURE 5). Here, the manner will be confirmed that subpixel displacement estimation error is varied depending on the order of an interpolation function for use in creating an interpolation image. Then, the subpixel estimation result by the interpolation image using linear interpolation is regarded as the result by the gradient-based method. Furthermore, the subpixel estimation result by the interpolation image using a higher order interpolation function is also discussed.

(3-4) Subpixel Estimation by Traditional Bilinear Image Interpolation

Suppose two images for subpixel displacement are $I_1(u,v)$, $I_2(u,v)$. Suppose these images have undergone discretization sampling. More specifically, u and v are integers. Moreover, $0 \leq d_s \leq 1$, $0 \leq d_t \leq 1$ where displacement between images is $(d_s, d_t)$. When there is no true displacement between images in the ranges, the entire image is moved by matching in pixels.

The subpixel estimation value using bilinear interpolation (two-directional linear interpolation) $(\hat{d}_s, \hat{d}_t)$ can be expressed by the following Equation 51.

$$(\hat{d}_s, \hat{d}_t) = \operatorname{argmin} \sum_{i,j \in W} (I_1(i,j) - I_{2il}(i,j))^2 \quad \text{(Equation 51)}$$

$$I_{2il}(i,j) = (1-\hat{d}_s)(1-\hat{d}_t)I_2(i,j) +$$
$$\hat{d}_s(1-\hat{d}_t)I_2(i+1,j) +$$
$$(1-\hat{d}_s)\hat{d}_t I_2(i,j+1) + \hat{d}_s\hat{d}_t I_2(i+1,j+1)$$

Where the range of the total sum is the focused area in a given shape, and argmin is an operation that determines a set of $(\hat{d}_s, \hat{d}_t)$ which makes the value minimum.

The subpixel estimation errors of the above Equation 51 with respect to three images $\theta_g=0, \pi/8, \pi/4$ are shown in (i) and (j) in FIGS. 16, 17, and 18, respectively. (i) and (j) show the horizontal estimation error $\text{error}_s$ and the vertical estimation error $\text{error}_t$, respectively.

FIG. 16 shows the results using the image $\theta_g=0$, and no anisotropy occurs in the two-dimensional similarity at this time. At this time, no estimation error is generated. FIGS. 17 and 18 show the results using the images $\theta_g=\pi/8, \pi/4$, and anisotropy occurs in the two-dimensional similarity at this time. At this time, estimation error is generated. The size of estimation error depends on the rotation angle of two-dimensional similarity having anisotropy and true displacement between images.

The estimation error is greater than the results shown in (c) and (d) in FIGS. 16, 17, and 18. More specifically, the two-dimensional estimation method of embodiment 1 according to the invention can estimate displacement highly precisely more than the subpixel estimation method by the traditional bilinear interpolation. Since the subpixel estimation method by bilinear interpolation is equivalent to the gradient-based method, it can be said that the two-dimensional estimation method of embodiment 1 according to the invention can estimate subpixel displacement highly precisely more than the traditional gradient-based method.

Moreover, the estimation error corresponding to the gradient-based method is much smaller than the result by the one-dimensional estimation method in (g) and (h) in FIGS. 16, 17, and 18. More specifically, the gradient-based method can estimate two-dimensional subpixel displacement highly precisely more than a method in which region-based matching traditionally, widely used is done in pixels and similarity is used to one-dimensionally estimate subpixel displacement. Therefore, it is recognized that the gradient-based method is highly precise more than region-based matching. However, the two-dimensional estimation method of embodiment 1 according to the invention is used to estimate subpixel displacement highly precisely much more than the gradient-based method.

(3-5) Subpixel Estimation by Traditional Bicubic Image Interpolation

In consideration of higher terms when an interpolation image is created, an interpolation image of high precision can be created. Bicubic interpolation (two-directional cubic interpolation) is an interpolation method that uses the pixel value in 4×4 around a subpixel pixel position to be interpolated. The subpixel estimation value $(\hat{d}_s, \hat{d}_t)$ using bicubic interpolation can be expressed by the following Equation 52.

$$(\hat{d}_s, \hat{d}_t) = \operatorname{argmin} \sum_{i,j \in W} (I_1(i,j) - I_{2i3}(i,j))^2 \quad \text{(Equation 52)}$$

$$I_{2i3}(i,j) = [h_{y1} \quad h_{y2} \quad h_{y3} \quad h_{y4}] \times$$
$$\begin{bmatrix} I_2(i-1,j-1) & I_2(i,j-1) & I_2(i+1,j-1) & I_2(i+2,j-1) \\ I_2(i-1,j) & I_2(i,j) & I_2(i+1,j) & I_2(i+2,j) \\ I_2(i-1,j+1) & I_2(i,j+1) & I_2(i+1,j+1) & I_2(i+2,j+1) \\ I_2(i-1,j+2) & I_2(i,j+2) & I_2(i+1,j+2) & I_2(i+2,j+2) \end{bmatrix}$$
$$\begin{bmatrix} h_{x1} \\ h_{x2} \\ h_{x3} \\ h_{x4} \end{bmatrix}$$

$h_{x1} = h(-1-\hat{d}_s)$ $h_{x2} = h(0-\hat{d}_s)$ $h_{x3} = h(2-\hat{d}_s)$ $h_{x4} = h(2-\hat{d}_s)$ $h_{y1} = h(-1-\hat{d}_t)$ $h_{y2} = h(0-\hat{d}_t)$ $h_{y3} = h(1-\hat{d}_t)$ $h_{y4} = h(2-\hat{d}_t)$ Where the range of the total sum is a focused area in a given shape, and argmin is an operation that determines a set $(\tilde{d}_s, \tilde{d}_t)$ that makes the value minimum. At this time, a weighting function h(x) is proposed variously based on a sinc function, and the following Equation 53 is used in many cases.

$$h(x) = \begin{cases} (a+2)|x|^3 - (a+3)|x|^2 + 1 & \text{(if } |x| \leq 1) \\ a|x|^3 - 5a|x|^2 + 8a|x| - 4a & \text{(if } 1 < |x| \leq 2) \\ 0 & \text{(otherwise)} \end{cases}$$ (Equation 53)

Where a is an adjustment parameter, and a=−1 and a=−0.5 are often used.

In addition, the following Equation 54 is also often used.

$$h(x) = \begin{cases} (12 - 9B - 6C)|x|^3 + & \text{(if } |x| \leq 1) \\ (-18 + 12B + 6C)|x|^2 + (6 - 2B) & \\ (-B - 6C)|x|^3 + (6B + 30C)|x|^2 + & \text{(if } 1 < |x| \leq 2) \\ (-12B - 48C)|x| + (8B + 24C) & \\ 0 & \text{(otherwise)} \end{cases}$$ (Equation 54)

B and C are adjustment parameters that approximate Cubic B spline where B=1, C=0, and become Catmull-Romcubic characteristics where B=0, C=0.5. In this manner, interpolation characteristics are varied depending on the way to select weighting coefficients. Here, parameter a=−0.55 is adopted in the weighting function of Equation 53. However, a=−1 is most introduced in textbooks and the like for image processing. The difference between characteristics of both methods will be described later, but a=−0.55 was numerically decided so as to reduce the subpixel estimation error.

The subpixel estimation errors of Equation 52 with respect to three images, $\theta_g=0$, $\pi/8$, $\pi/4$ are shown in (k) and (l) in FIGS. 16, 17, and 18, respectively. (k) and (l) show the horizontal estimation error $error_s$ and the vertical estimation error $error_t$, respectively.

FIG. 16 shows the results using the image $\theta_g=0$, but no anisotropy occurs in the two-dimensional similarity at this time. At this time, estimation error is not generated. FIGS. 17 and 18 show the results using the images $\theta_g=\pi/8$ and $\pi/4$, respectively, and anisotropy occurs in the two-dimensional similarity at this time. At this time, estimation error is generated. The size of estimation error depends on the rotation angle of two-dimensional similarity having anisotropy and true displacement between images.

The estimation errors are almost the same as the results of two-dimensional estimation in (c) and (d) in FIGS. 16, 17, and 18. More specifically, it can be said that the two-dimensional subpixel estimation method of embodiment 1 according to the invention is highly precise almost the same as subpixel estimation using a higher order interpolation image when the optimum parameter is selected.

In the mean time, parameter a in Equation 53 will be described as showing a more specific computation example. It can be considered that Equation 53 is a weighting coefficient that a sinc function is approximated in a definite range.

Figure 19:
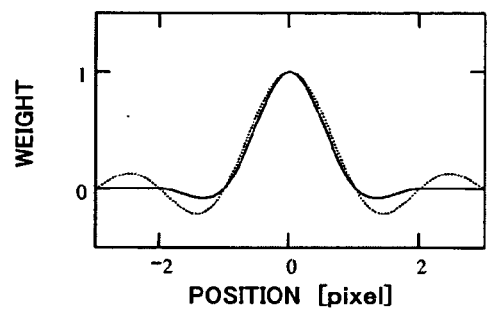
FIG. 19 is a illustrative diagram of interpolation characteristics depending on a weighting function and parameters.
Figure 19:
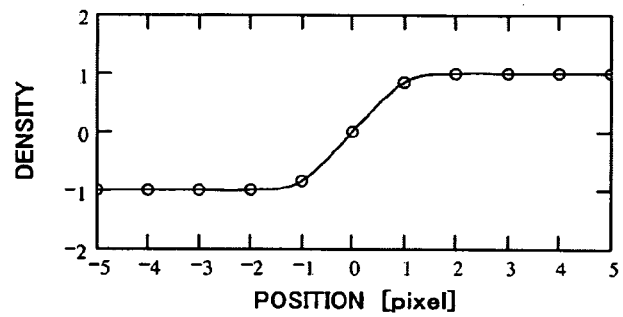
Figure 19:
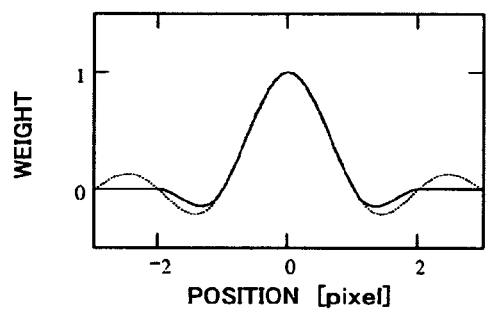
Figure 19:
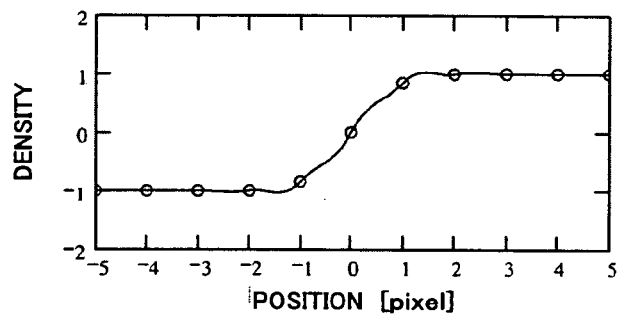

Parameter a adjusts the approximate characteristics. FIGS. 19 (a) and (b) show h(x) when a=−0.55, and the interpolation result of a linear function f(i) having a value at integer positions. f(i) is $\sigma_{image}=0.7$ in Equation 7. Moreover, FIGS. 19(c) and (d) show h(x) when a=−1.0, and the interpolation result of a linear function f(i) having a value at integer positions.

a=−1.0 is a parameter that is introduced as bicubic interpolation in many textbooks and the like for image processing. Although it approximates a sinc function well, it is hard to said that it interpolates at least the function f(i) studied here well. Although a=−0.55 is not so well as approximation for a sinc function, it interpolates the function f(i) well.

Parameter a=−0.55 is used from FIG. 16 to FIG. 18, and this value is the result that was numerically determined so as to reduce the subpixel estimation error. The error is almost the same as the result of bilinear interpolation when a=−0.5 is used, whereas the error is increased more than the result of subpixel estimation using bilinear interpolation when a=−1.0 is used.

(3-6) General Comparison of Estimation Error by Each Method

Hereinafter, the parameters for the two-dimensional image are varied in a wider range to compare and discuss the subpixel estimation error of each method. For the two-dimensional image, the corner image described above is used. For the parameters to be considered, the rotation angle is $\theta_g=0$, $\pi/16$, $2\pi/16$, $3\pi/16$, $4\pi/16$, and the corner angle is $\theta_c=\pi/4$, $\pi/3$ are considered. The estimation error with respect to ten types of two-dimensional images in total is discussed. In addition, $\sigma_{image}=1.0$ is considered.

The displacement between images is given by every 0.1 [pixel] in the ranges of $-0.5 \leq d_s \leq +0.5$, $-0.5 \leq d_t \leq +0.5$. At this time, the size of two-dimensional estimation error, and RMS error of $\sqrt{(\tilde{d}_s-d_s)^2+(\tilde{d}_t-d_t)^2}$ were evaluated.

For the evaluated subpixel estimation methods, the estimation result adapted to a subpixel estimation error reduction method with respect to a traditional one-dimensional estimation method was also evaluated in addition to each method described above. Therefore, the estimation errors of six types of estimation methods were evaluated:

Two-dimensional estimation of embodiment 1 according to the invention using the subpixel estimation error reduction method (2D-EEC)

Two-dimensional estimation of embodiment 1 according to the invention not using the subpixel estimation error reduction method (2D)

One-dimensional estimation using the subpixel estimation error reduction method (1D-EEC)

One-dimensional estimation not using the subpixel estimation error reduction method (1D)

Two-dimensional estimation using bilinear interpolation (Bi-Linear)

Two-dimensional estimation using bicubic interpolation (a=−0.55) (Bi-Cubic)

The estimated result is shown in Table 1.

TABLE 1

| Method | $\theta_c$[rad] | $\theta_g$[rad] | | | | | Total |
|---|---|---|---|---|---|---|---|
| | | 0 | $\pi/16$ | $2\pi/16$ | $3\pi/16$ | $4\pi/16$ | |
| 2D-EEC | $\pi/4$ | 0.001322 | 0.000969 | 0.002766 | 0.001963 | 0.000994 | 0.001638 |
| | $\pi/3$ | 0.000990 | 0.002325 | 0.001388 | 0.001109 | 0.001457 | |
| 2D | $\pi/4$ | 0.009593 | 0.009411 | 0.014590 | 0.010839 | 0.003346 | 0.008153 |
| | $\pi/3$ | 0.007485 | 0.006722 | 0.004023 | 0.003286 | 0.003787 | |
| 1D-EEC | $\pi/4$ | 0.001341 | 0.297529 | 0.343263 | 0.324090 | 0.315181 | 0.242521 |
| | $\pi/3$ | 0.001005 | 0.171184 | 0.218847 | 0.223680 | 0.224063 | |
| 1D | $\pi/4$ | 0.009715 | 0.297533 | 0.343867 | 0.325014 | 0.316467 | 0.243197 |
| | $\pi/3$ | 0.007583 | 0.172383 | 0.219518 | 0.224272 | 0.224803 | |
| Bi-Linear | $\pi/4$ | 0.009869 | 0.009900 | 0.010813 | 0.008352 | 0.007566 | 0.008746 |
| | $\pi/3$ | 0.007679 | 0.008859 | 0.008360 | 0.007766 | 0.007614 | |
| Bi-Cubic | $\pi/4$ | 0.006425 | 0.006153 | 0.004761 | 0.002894 | 0.000843 | 0.003979 |
| | $\pi/3$ | 0.004243 | 0.003878 | 0.003158 | 0.001924 | 0.000829 | |

From Table 1, the following is understandable.

First, one-dimensional estimation using the subpixel estimation error reduction method (1D-EEC) can reduce the estimation error with respect to traditional one-dimensional estimation (1D) when the rotation angle $\theta_g=0$. However, no difference appears when the rotation angle $\theta_g \neq 0$. The rotation angle $\theta_g$ corresponds to the rotation angle of similarity having anisotropy.

Then, two-dimensional estimations using bilinear interpolation (Bi-Linear) and bicubic interpolation (Bi-Cubic) have estimation error about two digits smaller than one-dimensional estimation (1D). The difference is significant. The two-dimensional estimation using bilinear interpolation (Bi-Linear) corresponds to the gradient-based method. This is the reason why the gradient-based method is considered to allow subpixel estimation highly precisely.

Furthermore, two-dimensional estimation using bicubic interpolation (Bi-Cubic) is highly precise more than two-dimensional estimation using bilinear interpolation (Bi-Linear). However, the result is varied depending on the parameters of the weighting function. The adjustment of the parameters of the weighting function corresponds to the adjustment of the characteristics of an interpolation filter. More specifically, a proper interpolation filter is selected to improve accuracy in the subpixel estimation method using image interpolation.

Finally, two-dimensional estimation (2D-EEC) of embodiment 1 according to the invention using the subpixel estimation error reduction method has smaller estimation error than that of two-dimensional estimation using bicubic interpolation (Bi-Cubic), and it does not need to adjust parameters. The two-dimensional estimation (2D-EEC) of embodiment 1 according to the invention using the subpixel estimation error reduction method has a greater computation cost than that of two-dimensional estimation (2D) of embodiment 1 according to the invention not using the subpixel estimation error reduction method. Then, putting importance on computation cost, the following separate use is possible. The two-dimensional estimation (2D) of embodiment 1 according to the invention not using the subpixel estimation error reduction method is used when the estimation result is almost the same as the gradient-based method, and the two-dimensional estimation (2D-EEC) of embodiment 1 according to the invention using the subpixel estimation error reduction method is used when the estimation result of higher precision is desired to be obtained.

(4) Estimation Experiment by a Computer Program on which the Two-Dimensional Estimation Method of Embodiment 1 According to the Invention is Implemented A computer program on which the two-dimensional estimation method of embodiment 1 according to the invention is implemented, was executed by an information process terminal equipped with CPU (computers such as a personal computer, and a workstation), and two-dimensional subpixel estimation experiment was conducted by using synthetic image and real image. In addition, the computer program referred in the invention is sometimes called a program for convenience.

(4-1) Estimation Experiment Using a Synthetic Image

The corner image described above was created for two-dimensional subpixel estimation experiment. The created synthetic image is an eight-bit monochrome image, the image size is 64×64 [pixel], and the focused range is 11×11 [pixel]. No noise is contained in the image. The parameters of the image are $\sigma_{image}=1.0$, the corner angle $\theta_c=\pi/4$, and the rotation angle $\theta_g=0$, $\pi/8$, $\pi/4$. The displacement between images was given by every 0.1 [pixel] in the ranges of $-0.5 \leq d_s \leq +0.5$, $-0.5 \leq d_s \leq +0.5$.

Figure 20:
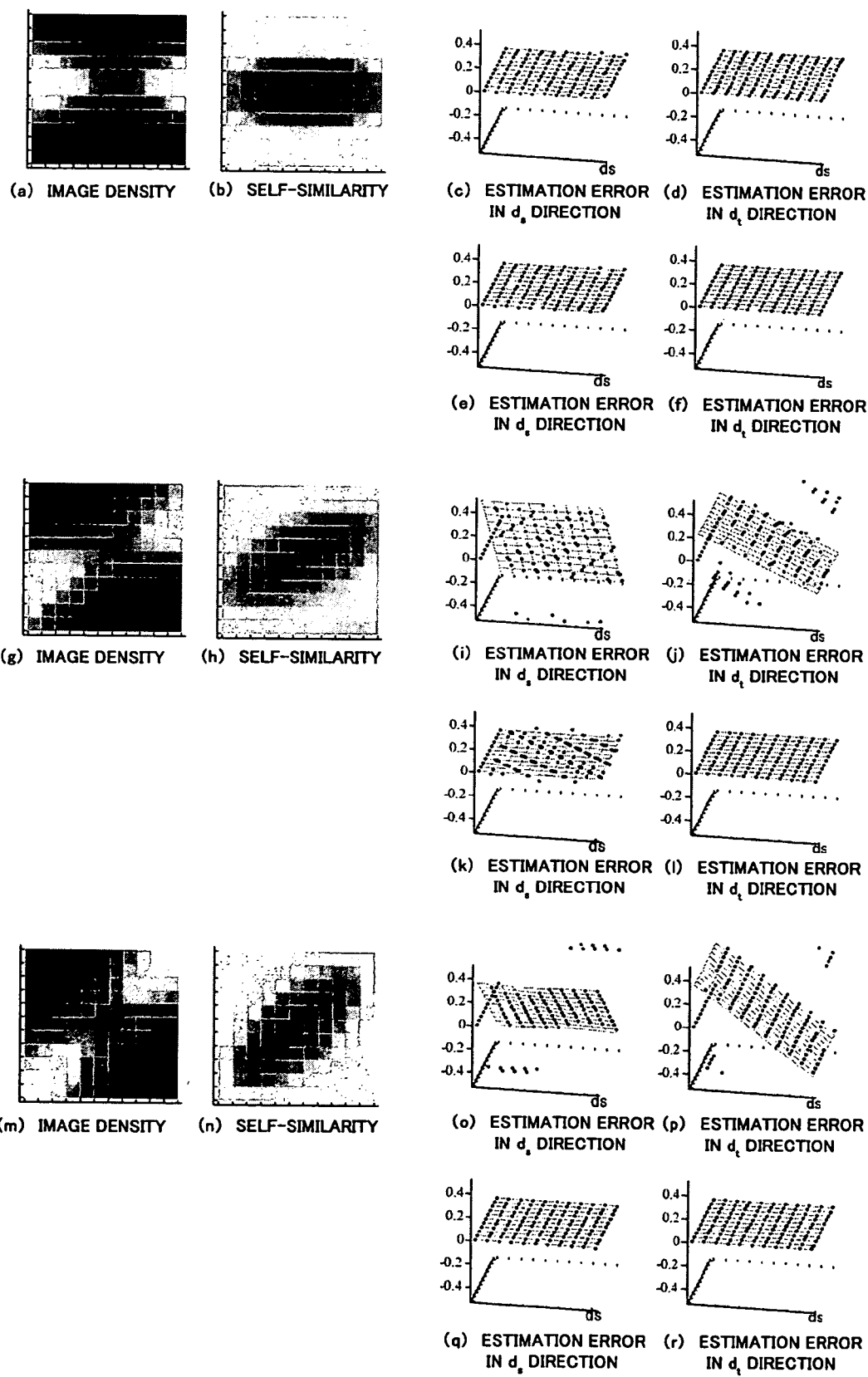
FIG. 20 is a diagram illustrating experimental results using synthetic images.

FIG. 20 shows the results of traditional one-dimensional estimation and two-dimensional estimation of embodiment 1 according to the invention to which the subpixel estimation error reduction method is adapted. In FIG. 20, the computation result is shown by mesh, and the experimental result is shown by a black circle. It can be considered that the difference between the experimental result and the computation result is caused by the image being an eight-bit quantization gray scale (256 gray scale). Furthermore, it can be considered that a great step was created because the result that had searched the maximum similarity in integers was moved to the adjacent pixel position. Moving to the adjacent position is a fundamental defect of the traditional one-dimensional estimation method.

(4-2) Estimation Experiment Using a Real Image

When the rotation angle $\theta_g$ of two-dimensional similarity obtained from an image used for matching is nearly zero, even the traditional one-dimensional estimation method generates no estimation error, but a great estimation error is likely to be generated when $\theta_g \neq 0$. Then, target tracking experiment was conducted using two types of patterns as matching patterns.

Figure 21:
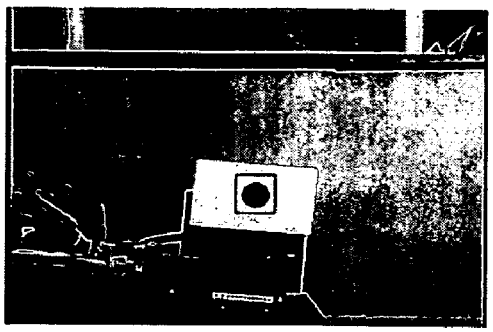
FIG. 21 is a diagram illustrating target tracking experimental results using real images.
Figure 21:
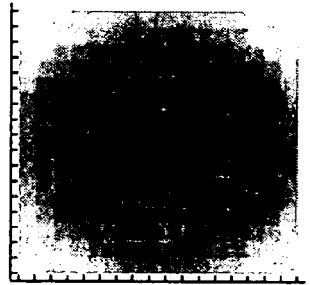
Figure 21:
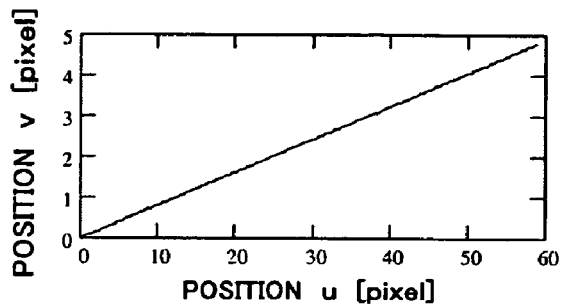
Figure 21:
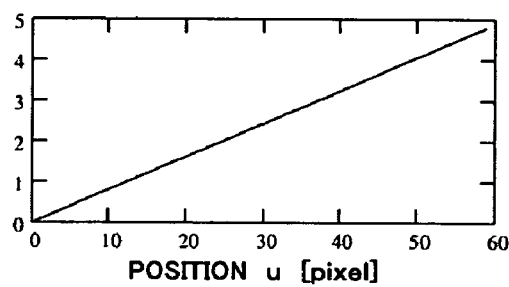
Figure 21:
Figure 21:
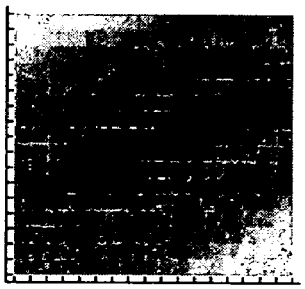
Figure 21:
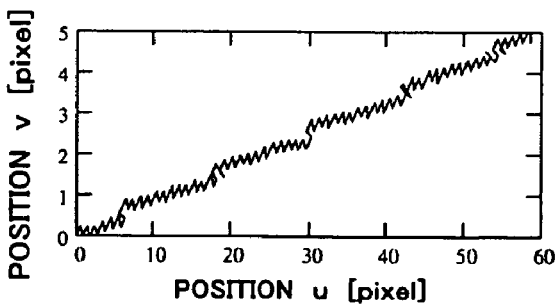
Figure 21:
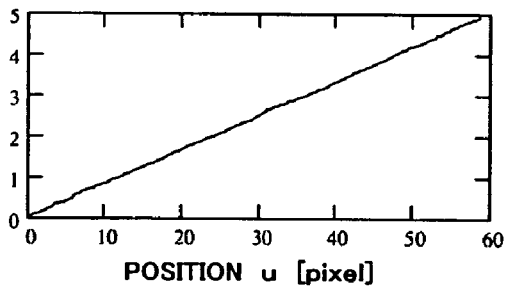

The matching patterns used are a circle pattern and an oblique edge pattern. The patterns are shown in FIGS. 21(a) and (e). The size of the circle pattern is about 41 [pixel] in diameter. In addition, the SSD self-similarities of these patterns are shown in FIGS. 21(b) and (f).

Since the self-similarity of the circle pattern has isotropy, it can be expected that the estimation error is small both in the traditional one-dimensional estimation method and the two-dimensional estimation method of embodiment 1 according to the invention. On the other hand, since the self-similarity corresponding to the oblique edge pattern has anisotropy and a tilt, it can be expected that the estimation error is great in the traditional one-dimensional estimation method and the estimation error is small in the two-dimensional estimation method of embodiment 1 according to the invention.

The matching patterns were printed on cardboard for a tracking target. The target moves linearly on a screw feed linear stage. The movement of the target was taken in about 250 images in time series, a first image was used as a reference pattern, and a target was tracked among the images after that. The size of the focused area is 60×60 [pixel] (a black square area in FIGS. 21(a) and (e)), the search area is ±8(17× 17) with respect to an expected position of the movement. The target moves slowly in the lower right direction on the image. When matching is done correctly and subpixel estimation has no error, the measurement trace is a straight line. The SSD self-similarity was used for both of the traditional one-dimensional estimation method and the two-dimensional estimation method of embodiment 1 according to the invention, and subpixel estimation was conducted by parabolic fitting to which the subpixel estimation error reduction method was adapted.

FIGS. 21(c) and (d) show the measurement results when a circle pattern was used as a tracking pattern. FIG. 21(c) shows the result using the traditional one-dimensional estimation method, and FIG. 21(d) shows the result using the two-dimensional estimation method of embodiment 1 according to the invention. In both cases, the subpixel estimation error is small, and the trace is an excellent straight line.

FIGS. 21(g) and (h) show the measurement results when an oblique edge pattern was used as a tracking pattern. FIG. 21(g) shows the result using the traditional one-dimensional estimation method, and (h) shows the result using the two-dimensional estimation method of embodiment 1 according to the invention. It is revealed that an enormous subpixel estimation error is generated in the traditional one-dimensional estimation method.

In the two-dimensional estimation method of embodiment 1 according to the invention, the estimation error is small regardless of the tracking patterns, but the measurement trace is deviated from the straight line more than in the circle pattern. It can be considered that this is caused by including error when HEL and VEL are linearly approximated because the two-dimensional similarity is different from the two-dimensional Gaussian model.

In reality, it is rare to use such tracking patterns. However, this experiment shows that an expected great subpixel estimation error is likely to be generated depending on matching patterns when the traditional one-dimensional estimation method is used. In this experiment, since it is known that the object is moving on the straight line, it was able to confirm subpixel estimation errors. However, for example, when multiple images taken in different directions are used to reconstruct three-dimensional information of a building, an area in an oblique edge pattern is sometimes used as a matching area. The traditional one-dimensional estimation method has a problem that a great estimation error is generated in this case.

In addition, in embodiment 1 according to the invention, the two-dimensional estimation method of embodiment 1 according to the invention can be expanded as follows. When the horizontal extreme value line HEL and the vertical extreme value line VEL are determined, three points are determined as a quadric curve instead that three points are determined as a line that approximates by the minimum square. Thus, the error by linear approximation is reduced.

Embodiment 2 and Embodiment 3

Embodiment 2 and embodiment 3 of the multiparameter high precision concurrent estimation method in image subpixel matching according to the invention will be described as below. The focused points of embodiment 2 and embodiment 3 according to the invention are as follows:

(A) Translation and rotation, or translation, rotation, and scale variation are set to correspondence parameters between images (in the invention, they are abbreviated to also call parameters), and the similarity is used that is obtained at discrete positions in the multidimensional space where these parameters are axes (in the invention, it is also called a parameter space or a multidimensional similarity space). It is fine that the similarity is computed at the discrete positions and there is no need for recursive computation.

(B) It is considered that the similarity obtained at discrete positions is that samples the similarity being a continuous function in the multidimensional space (that is, the parameter space).

(C) When the similarity is formed into a model under realistic assumptions, a hyperplane passes through the maximum value or the minimum value of similarity, which is obtained by partially differentiating the similarity at each axis (that is, each parameter axis in the parameter space) in the multidimensional space to zero. For example, the hyperplane passes through the minimum value of similarity when SAD and SSD are adopted for the similarity evaluation function. Furthermore, the hyperplane passes through the maximum value of similarity when ZNCC is adopted for the similarity evaluation function.

(D) The hyperplane like these can be determined by the number of axes (that is, the number of parameters) in the multidimensional space. Since the intersection point of coordinates of these hyperplanes is matched with the parameter that gives the maximum value or the minimum value of similarity in the multidimensional space, the intersection point of coordinates of these hyperplanes is determined to the parameter that gives the maximum value or the minimum value of similarity in the multidimensional space at the same time.

It can be considered that the multiparameter high precision concurrent estimation method in image subpixel matching according to the invention is the method that uses the evaluation values discretely obtained in a sampling grid to estimate the maximum position or the minimum position of the evaluation value for sub-sampling grid accuracy of high precision.

When it is considered that the correspondence between images is limited only to translation (that is, in the case of embodiment 1 according to the invention), the sampling grid corresponds to pixels forming an image. Thus, the expression of subpixel was suitable for the expression of the amount of translation more highly precise than the unit of pixels. Therefore, as described above, the multiparameter high precision concurrent estimation method in image subpixel matching of embodiment 1 according to the invention is also called the "two-dimensional subpixel estimation method".

However, in the invention in the case where translation and rotation, or translation, rotation, and scale variation are set to correspondence parameter between images, that is, in the multiparameter high precision concurrent estimation method of embodiment 2 and embodiment 3 according to the invention, the expression of pixels and subpixels lacks generality. Thus, hereinafter, the expressions of sampling grid and sub-sampling grid are used therefor.

<1> Three-Parameter Concurrent Estimation Method of Embodiment 2

<1-1> Principles of a Three-Parameter Concurrent Estimation Method

Here, the principles of a three-parameter concurrent estimation method of embodiment 2 according to the invention will be described. In the invention, when the correspondence between images is searched, some similarity evaluation function is used to search the minimum or the maximum of the similarity evaluation function. The similarity obtained at this time is varied depending on the similarity evaluation function to be used, and it is more greatly varied depending on images treated as input.

Here, more specific input images and similarity evaluation functions are not described, and the similarity between images is approximated by a three-dimensional Gaussian function below for a three-dimensional similarity model.

$$R_g(s_1, s_2, s_3) = \text{gauss}(t_1, \sigma) \times \text{gauss}(t_2, k_2\sigma) \times \text{gauss}(t_3, k_3\sigma)$$ (Equation 55)

$$\text{gauss}(x, \sigma) = \frac{1}{\sqrt{2\pi}\,\sigma} e^{-\frac{x^2}{2\sigma^2}}$$

Where $(s_1, s_2, s_3)$ is a search parameter (that is, a correspondence parameter between images), $\sigma$ is the standard deviation of the Gaussian function, and $(k_2, k_3)$ is an anisotropy coefficient $(k_2, k_3 > 0)$. Furthermore, $(t_1, t_2, t_3)$ is the result that $(s_1, s_2, s_3)$ underwent rotation and translation as below.

$$\begin{bmatrix} t_1 \\ t_2 \\ t_3 \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} s_1 - d_1 \\ s_2 - d_2 \\ s_3 - d_3 \end{bmatrix}$$ (Equation 56)

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} 1 & 0 & 0 \\ 0 & \cos\theta_1 & -\sin\theta_1 \\ 0 & \sin\theta_1 & \cos\theta_1 \end{bmatrix}$$

$$\begin{bmatrix} \cos\theta_2 & 0 & \sin\theta_2 \\ 0 & 1 & 0 \\ -\sin\theta_2 & 0 & \cos\theta_2 \end{bmatrix}$$

$$\begin{bmatrix} \cos\theta_3 & -\sin\theta_3 & 0 \\ \sin\theta_3 & \cos\theta_3 & 0 \\ 0 & 0 & 1 \end{bmatrix}$$

Where $(d_1, d_2, d_3)$ is the true answer value of the search parameter $(s_1, s_2, s_3)$, $(\theta_1, \theta_2, \theta_3)$ is the rotation angle about each axis of $(s_1, s_2, s_3)$, respectively, and the ranges of $0 \leq \theta_1, \theta_2, \theta_3 \leq \pi/2$ are considered.

When the three-dimensional similarity model is partially differentiated by $s_1, s_2, s_3$ to zero, the following three planes can be obtained.

$$\Pi_1: \left(a_{11}^2 + \frac{a_{21}^2}{k_2^2} + \frac{a_{31}^2}{k_3^2}\right)(s_1 - d_1) +$$ (Equation 57)

$$\left(a_{11}a_{12} + \frac{a_{21}a_{22}}{k_2^2} + \frac{a_{31}a_{32}}{k_3^2}\right)(s_2 - d_2) +$$

$$\left(a_{11}a_{13} + \frac{a_{21}a_{23}}{k_2^2} + \frac{a_{31}a_{33}}{k_3^2}\right)(s_3 - d_3) = 0$$

$$\Pi_2: \left(a_{11}a_{12} + \frac{a_{21}a_{22}}{k_2^2} + \frac{a_{31}a_{32}}{k_3^2}\right)(s_1 - d_1) +$$ (Equation 58)

$$\left(a_{12}^2 + \frac{a_{22}^2}{k_2^2} + \frac{a_{32}^2}{k_3^2}\right)(s_2 - d_2) +$$

$$\left(a_{12}a_{13} + \frac{a_{22}a_{23}}{k_2^2} + \frac{a_{32}a_{33}}{k_3^2}\right)(s_3 - d_3) = 0$$

$$\Pi_3: \left(a_{11}a_{13} + \frac{a_{21}a_{23}}{k_2^2} + \frac{a_{31}a_{33}}{k_3^2}\right)(s_1 - d_1) +$$ (Equation 59)

$$\left(a_{12}a_{13} + \frac{a_{22}a_{23}}{k_2^2} + \frac{a_{32}a_{33}}{k_3^2}\right)(s_2 - d_2) +$$

$$\left(a_{13}^2 + \frac{a_{23}^2}{k_2^2} + \frac{a_{33}^2}{k_3^2}\right)(s_3 - d_3) = 0$$

$\Pi_1$, $\Pi_2$, and $\Pi_3$ form three planes in a three-dimensional space (that is, a parameter space where $s_1, s_2, s_3$ are axes). The intersection point of these three planes is clearly $(d_1, d_2, d_3)$, and matched with the true answer parameter. The condition that the intersection point of three planes is not determined is the case where the three-dimensional similarity model is degenerated below three dimensions. Under this condition, it becomes $k_2, k_3 = 0$ or $\infty$, and is not matched with the condition for the three-dimensional similarity model.

<1-2> Implement of the Three-Parameter Concurrent Estimation Method

Hereinafter, a more specific method will be described that determines a sub-sampling grid estimation value in the three-parameter concurrent estimation method. For example, it can be considered that three parameters are the amount of translation $(d_s, d_t)$ and the rotation angle $\theta$.

As described in the paragraph above, "the principles of the three-parameter concurrent estimation method", the similarity value in the parameter space is differentiated to zero with respect to each parameter axis, and thus three planes can be created that pass through the maximum value position or the minimum value position of each parameter. Therefore, when the similarity value obtained in the sampling grid is used to estimate these three planes, the maximum position or the minimum position of the similarity value of each parameter can be determined in the sub-sampling grid.

Figure 22:
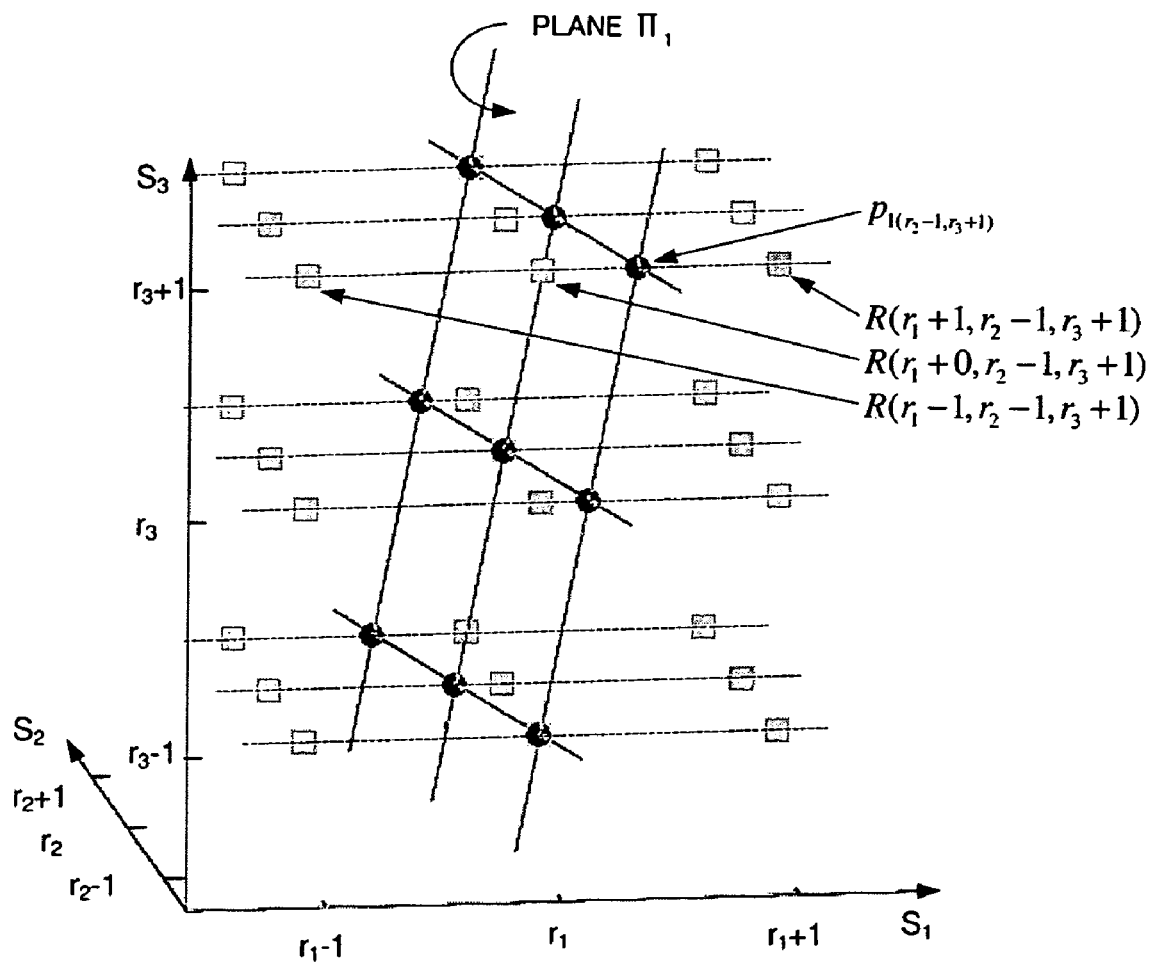
FIG. 22 is a schematic diagram illustrative of plane $\Pi_1$ that passes through the maximum value with respect to parameter $s_1$ in the three-parameter concurrent estimation method of embodiment 2 according to the invention.

First, the way to determine plane $\Pi_1$ will be described. A point on plane $\Pi_1$ is the point where the result that has differentiated the similarity along with $s_1$ axis is zero. Thus, the similarity value on the line in parallel with $s_1$ axis is used to estimate the sub-sampling position, and then some of points on plane $\Pi_1$ can be determined. FIG. 22 is a schematic diagram illustrative of plane $\Pi_1$ passing through the maximum value in regard to parameter axis $s_1$. In FIG. 22, the sampling position where the similarity value has been obtained is showed by a square, and the sub-sampling estimation position having been obtained on the line in parallel with is showed by a black circle. The maximum value position in the grid unit of the similarity value is $(r_1, r_2, r_3)$.

Suppose the similarity value in $(s_1, s_2, s_3)$ is $R(s_1, s_2, s_3)$, the similarity value $R(r_1+i_1, r_2+i_2, r_3+i_3)$ $(i_1, i_2, i_3 = -1, 0, 1)$ at 27 points is used to estimate $(p_{1(r_2+i_2, r_3+i_3)}, r_2+i_2, r_3+i_3)$, nine points on plane $\Pi_1$. For estimation, the following parabolic fitting can be used.

$$p_{1(r_2+i_2,r_3+i_3)} = \frac{R(r_1-1, r_2+i_2, r_3+i_3) - R(r_1+1, r_2+i_2, r_3+i_3)}{2R(r_1-1, r_2+i_2, r_3+i_3) - 4R(r_1, r_2+i_2, r_3+i_3) + 2R(r_1+1, r_2+i_2, r_3+i_3)}$$ (Equation 60)

Moreover, as described later, a method that reduces the estimation error caused by parabolic fitting can be adapted.

When parabolic fitting of Equation 60 is conducted, a premise is that the similarity value $R(r_1, r_2+i_2, r_3+i_3)$ is the maximum. However, this premise is sometimes not held depending on image patterns. For example, when shear deformation of texture included in an image is extreme, $R(r_1, r_2+i_2, r_3+i_3)$ is not sometimes the maximum value at the position $i_2=i_3=\pm 1$. At this time, it is also necessary to determine the sub-sampling grid estimation position on the line that passes through $(r_2+i_2, r_3+i_3)$ in parallel with parameter axis $s_1$. In this case, it is fine that the maximum value position of the similarity value determined on the sampling grid on the straight line is searched for parabolic fitting of Equation 60 in regard to the corrected maximum value position $r_1'$.

Hereinafter, in the description, for simple notation of equations, it is considered that translation is conducted by $(r_1, r_2, r_3)$ along each parameter axis as $s_1-r_1 \to s_1 - r_2 \to s_2, s_3-r_3 \to s_3$, and $(r_1 r_2 r_3)$ is the origin point position of the parameter axes. Such translation is equal to moving the maximum similarity position to the origin point in grids, which still has generality with respect to the invention. The sub-sampling grid position determined by the multiparameter high precision concurrent estimation method according to the invention is finally added to $(r_1, r_2, r_3)$, and thus the sub-sampling grid position before translation can be computed easily.

Nine points of sub-sampling grid positions expected to be on plane $\Pi_1$ are unlikely to be completely on the plane due to the influence of noise and deformation between images in actual images. Therefore, these nine points are fit to plane $\Pi_1$ by least squares. More specifically, a coefficient is decided so that the sum of squares of the distance along $s_1$ axis between nine points and plane $\Pi_1$ is the minimum. Plane $\Pi_1$ can be determined as below:

$\Pi_1 : A_s s_1 + B_1 s_2 + C_1 s_3 + D_1 = 0$ $A_1 = 18$ $B_1 = -3(p_{1(1,1)} + p_{1(1,0)} + p_{1(1,-1)} - (p_{1(-1,1)} + p_{1(-1,0)} + p_{1(-1,-1)}))$ $C_1 = -3(p_{1(1,1)} + p_{1(0,1)} + p_{1(-1,1)} - (p_{1(1,-1)} + p_{1(0,-1)} + p_{1(-1,-1)}))$ $D_1 = -2(p_{1(1,1)} + p_{1(0,1)} + p_{1(-1,1)} + p_{1(1,0)} + p_{1(0,0)} + p_{1(-1,0)} + p_{1(1,-1)} + p_{1(0,-1)} + p_{1(-1,-1)})$ (Equation 61)

Similarly, planes $\Pi_2, \Pi_3$ can be determined as below:

$\Pi_2 : A_2 s_1 + B_2 s_2 + C_2 s_3 + D_2 = 0$ $A_2 = -3(p_{2(1,1)} + p_{2(0,1)} + p_{2(-1,1)} - (p_{2(1,-1)} + p_{2(0,-1)} + p_{2(-1,-1)}))$ $B_2 = 18$ $C_2 = -3(p_{2(1,1)} + p_{2(1,0)} + p_{2(1,-1)} - (p_{2(-1,1)} + p_{2(-1,0)} + p_{2(-1,-1)}))$ $D_2 = -2(p_{2(1,1)} + p_{2(0,1)} + p_{2(-1,1)} + p_{2(1,0)} + p_{2(0,0)} + p_{2(-1,0)} + p_{2(1,-1)} + p_{2(0,-1)} + p_{2(-1,-1)})$ (Equation 62)

$\Pi_3 : A_3 s_1 + B_3 s_2 + C_3 s_3 + D_3 = 0$ $A_3 = -3(p_{3(1,1)} + p_{3(1,0)} + p_{3(1,-1)} - (p_{3(-1,1)} + p_{3(-1,0)} + p_{3(-1,-1)}))$ $B_3 = -3(p_{3(1,1)} + p_{3(0,1)} + p_{3(-1,1)} - (p_{3(1,-1)} + p_{3(0,-1)} + p_{3(-1,-1)}))$ $C_3 = 18$ $D_3 = -1(p_{3(1,1)} + p_{3(0,1)} + p_{3(-1,1)} + p_{3(1,0)} + p_{3(0,0)} + p_{3(-1,0)} + p_{3(1,-1)} + p_{3(0,-1)} + p_{3(-1,-1)})$ (Equation 63)

The intersection point $(\hat{d}_1, \hat{d}_2, \hat{d}_3)$ of planes $\Pi_1, \Pi_2, \Pi_3$ can be determined at the sub-sampling estimation position as below:

$$\begin{bmatrix} A_1 & B_1 & C_1 \\ A_2 & B_2 & C_2 \\ A_3 & B_3 & C_3 \end{bmatrix} \begin{bmatrix} \hat{d}_1 \\ \hat{d}_2 \\ \hat{d}_3 \end{bmatrix} + \begin{bmatrix} D_1 \\ D_2 \\ D_3 \end{bmatrix} = \begin{bmatrix} 0 \\ 0 \\ 0 \end{bmatrix}$$ (Equation 64)

$$\begin{bmatrix} \hat{d}_1 \\ \hat{d}_2 \\ \hat{d}_3 \end{bmatrix} = -\begin{bmatrix} A_1 & B_1 & C_1 \\ A_2 & B_2 & C_2 \\ A_3 & B_3 & C_3 \end{bmatrix}^{-1} \begin{bmatrix} D_1 \\ D_2 \\ D_3 \end{bmatrix}$$ (Equation 65)

<2> N-Parameter Concurrent Estimation Method of Embodiment 3

<2-1> Principles of an N-Parameter Concurrent Estimation Method

Here, the principles of an N-parameter concurrent estimation method of embodiment 3 according to the invention will be described. Also in the case where the number of parameters is equal to or above three, the invention can conduct sub-sampling grid high precision concurrent estimation in similar concepts. When the similarity value is decided by N parameters from $s_1$ to $s_N$, the similarity value is expressed as n multiplications of a Gaussian function.

$$R_{gn}(s, A, \sigma, k) = A \prod_{i=1}^{N} \text{gauss}(s_i, k_i \sigma)$$ (Equation 66)

Where s is an N-dimensional vector that expresses coordinates in an N-dimensional similarity space, A is a matrix that expresses rotation and translation in the N-dimensional space, and k is a anisotropy coefficient vector (N−1 dimensions) of the gaussian function.

At this time, the N-dimensional similarity model expressed by Equation 66 is partially differentiated by $s_i$ (i=1, 2, ..., N) to zero, and thus N N-dimensional equations below can be obtained.

$$\frac{\partial}{\partial s_i} R_{gn}(s, A, \sigma, k) = 0, \; i = 1, 2, \ldots, N$$ (Equation 67)

These equations are solved in simultaneous equations to obtain the sub-sampling grid estimation value of N-dimensional similarity. More specifically, the solution of these equations is to be the sub-sampling grid estimation value of N-dimensional similarity. In addition, when the N-dimensional similarity model is deviated from Gaussian function multiplication model approximation of Equation 66, Equation 67 is not a complete hyperplane, but it can be approximated to a hyperplane by least squares at this time.

<2-2> Implement of the N-Parameter Concurrent Estimation Method

Hereinafter, a more specific method will be described that actually conducts sub-sampling grid concurrent estimation for N parameters. First, when sub-sampling grid concurrent estimation is conducted, for premises, the maximum similarity position is known in a sampling grid, and its (displacement) position is $r=(r_1, r_2, \ldots, r_N)$.

On N-dimensional hyperplane $\Pi_i$ where the result that the similarity value R has been partially differentiated with respect to parameter axis $s_i$ ($i=1, 2, \ldots, N$) is zero, there are $3^{N-1}$ positions, $c_1(i,1)p_i(c_2(i,j))+c_2(i,j)$ ($j=1, 2, \ldots, 3^{N-1}$) that three values of the similarity value $R(r+c_1(i,-1)+c_2(i,j))$, $R(r+c_1(i,0)+c_2(i,j))$, $R(r+c_1(i,+1)+c_2(i,j))$ on the line in parallel with $s_i$ parameter axis, which have undergone sub-sampling grid estimation by parabolic fitting. Where:

$$p_i(c_2(i,j)) = \frac{R(r+c_1(i,-1)+c_2(i,j)) - R(r+c_1(i,+1)+c_2(i,j))}{2R(r+c_1(i,-1)+c_2(i,j)) - 4R(r+c_1(i,0)+c_2(i,j)) + 2R(r+c_1(i,+1)+c_2(i,j))} \quad \text{(Equation 68)}$$

Here, $c_1(i,k)$ is an N-dimensional vector that only the ith element is value $k(k=-1,0,+1)$ and the other elements are all value 0. For example, $c_1(3,1)=(0, 0, 1, 0, \ldots, 0)$. Furthermore, $c_2(i,j)$ is the jth ($j=1, 2, \ldots, 3^{N-1}$) N-dimensional vector that that only the ith element is zero and each of the other elements takes any one of $-1,0,1$. For example, $c_2(3,1)=(-1, -1, 0, -1, \ldots, -1)$ These $3^{N-1}$ positions, $c_1(i,1)p_i(c_2(i,j))+c_2(i,j)$ are on N-dimensional hyperplane $\Pi_i$, or fit to N-dimensional hyperplane $\Pi_i$ in the meaning of at least the minimum square. Therefore, N-dimensional hyperplane $\Pi_i$ is expressed as:

$$a_{i1}s_1+a_{i2}s_2+\ldots+a_{iN}s_N=1 \quad \text{(Equation 69)}$$

Then, the following relationship can be obtained with respect to $3^{N-1}$ positions, $c_1(i,1)p_i(c_2(i,j))+c_2(i,j)$.

$$\begin{bmatrix} c_1(i,1)p_i(c_2(i,1))+c_2(i,1) \\ c_1(i,1)p_i(c_2(i,2))+c_2(i,2) \\ \vdots \\ \vdots \\ c_1(i,1)p_i(c_2(i,3^{N-1}))+c_2(i,3^{N-1}) \end{bmatrix} \begin{bmatrix} a_{i1} \\ a_{i2} \\ \vdots \\ a_{iN} \end{bmatrix} = \begin{bmatrix} 1 \\ 1 \\ 1 \\ 1 \\ 1 \end{bmatrix} \quad \text{(Equation 70)}$$

This is rewritten as below:

$$M_i a_i = b_i \quad \text{(Equation 71)}$$

Where $M_i$ is a matrix of $3^{N-1}$ rows by N columns, and $a_i$ is a vector of the element number being N. The coefficient $a_i$ that expresses N-dimensional hyperplane $\Pi_i$ can be determined by least squares using a generalized inverse matrix as below:

$$a_i = (M_i^T M_i)^{-1} M_i^T b_i \quad \text{(Equation 72)}$$

For the intersection point of N N-dimensional hyperplanes $\Pi_i$ ($i=1, 2, \ldots, N$) thus determined, the sub-sampling grid estimation value of N parameters can be obtained. The intersection point can be determined as below:

$$\begin{bmatrix} a_{11} & a_{12} & a_{13} & \ldots & a_{1N} \\ a_{21} & a_{22} & a_{23} & \ldots & a_{2N} \\ \vdots & & & & \vdots \\ \vdots & & & & \vdots \\ a_{N1} & a_{N2} & a_{N3} & \ldots & a_{NN} \end{bmatrix} \begin{bmatrix} \hat{s}_1 \\ \hat{s}_2 \\ \vdots \\ \vdots \\ \hat{s}_N \end{bmatrix} = \begin{bmatrix} 1 \\ 1 \\ 1 \\ 1 \\ 1 \end{bmatrix} \quad \text{(Equation 73)}$$

$$\begin{bmatrix} \hat{s}_1 \\ \hat{s}_2 \\ \vdots \\ \vdots \\ \hat{s}_N \end{bmatrix} = \begin{bmatrix} a_{11} & a_{12} & a_{13} & \ldots & a_{1N} \\ a_{21} & a_{22} & a_{23} & \ldots & a_{2N} \\ \vdots & & & & \vdots \\ \vdots & & & & \vdots \\ a_{N1} & a_{N2} & a_{N3} & \ldots & a_{NN} \end{bmatrix}^{-1} \begin{bmatrix} 1 \\ 1 \\ 1 \\ 1 \\ 1 \end{bmatrix} \quad \text{(Equation 74)}$$

The method above can conduct concurrent estimation for N parameters, but actually, it is fine that the equation of N-dimensional hyperplane $\Pi_i$ is expressed in the form including the same N number of unknowns.

$$a_{i1}s_1+a_{i2}s_2+\ldots+a_{iN}s_N=a_{iN+1}$$

$$a_{ii}=1 \quad \text{(Equation 75)}$$

This is because the intersection point of the hyperplane can stably exist even though the N-dimensional similarity function is N-dimensionally symmetrical.

Moreover, the coefficient of the N-dimensional hyperplane is determined by determining $3^{n-1}$ positions on N-dimensional hyperplane $\Pi_i$, but the number can be reduced. For example, $3^{N-1}=9$ when N=3, but it is expressed as below more specifically when j=3, for example.

(−1,−1,0) (0,−1,0) (+1,−1,0)

(−1,0.0) (0.0.0) (+1,0,0)

(−1,+1,0) (0,+1,0) (+1,+1,0)

The following set is adopted among these to allow the number to 2(N−1)+1.

(0,−1,0)

(−1,0,0) (0,0,0) (+1,0,0)

(0,+1,0)

Figure 23:
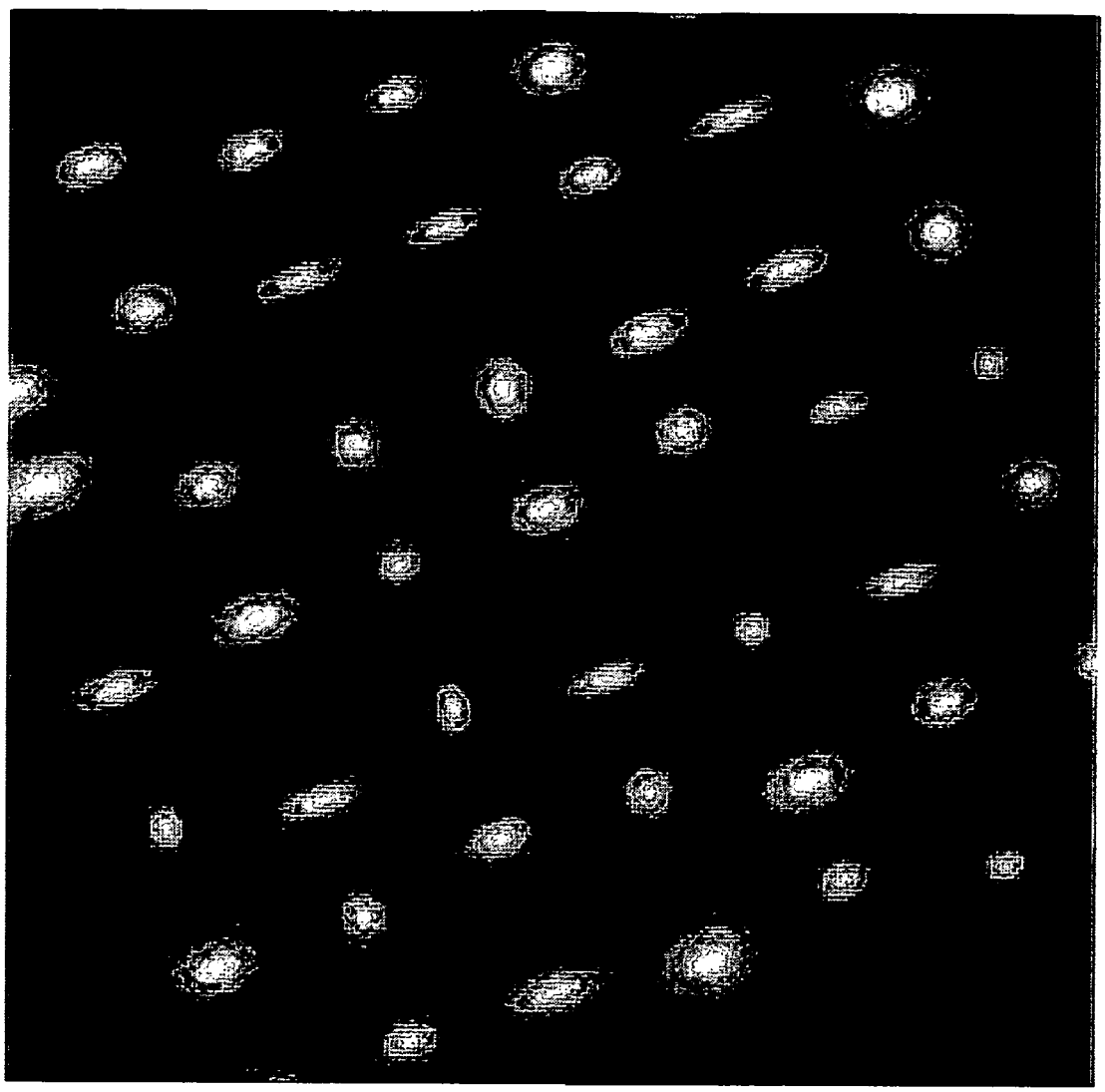
FIG. 23 is a synthetic image used for an experiment.

<3> Comparison of the Experimental Result by the Invention with the Experimental Result by the Traditional Method A time series image shown in FIG. 23 was synthetically created. The time series image is configured of a two-dimensional Gaussian function expressed by shadings. The two-dimensional Gaussian function used in this experiment has directivity (anisotropy), and the directivity is set so as to be directed to a direction other than zero or an angle of 90 degrees. As a result, the similarity computed from this image has anisotropy, and the rotation angle becomes an angle other than 0 or 90 degrees.

The image shown in FIG. 23 is the first frame of the time series image. The frames after that are not varied in positions with respect to the first frame, and only the rotation angle is varied by an angle of 0.1 degree at every frame. The time series image has 31 frames in total, and the last frame is an image that is rotated at an angle of three degrees with respect to the first frame. However, the position in the image is not moved with respect to the center of rotation.

Figure 24:
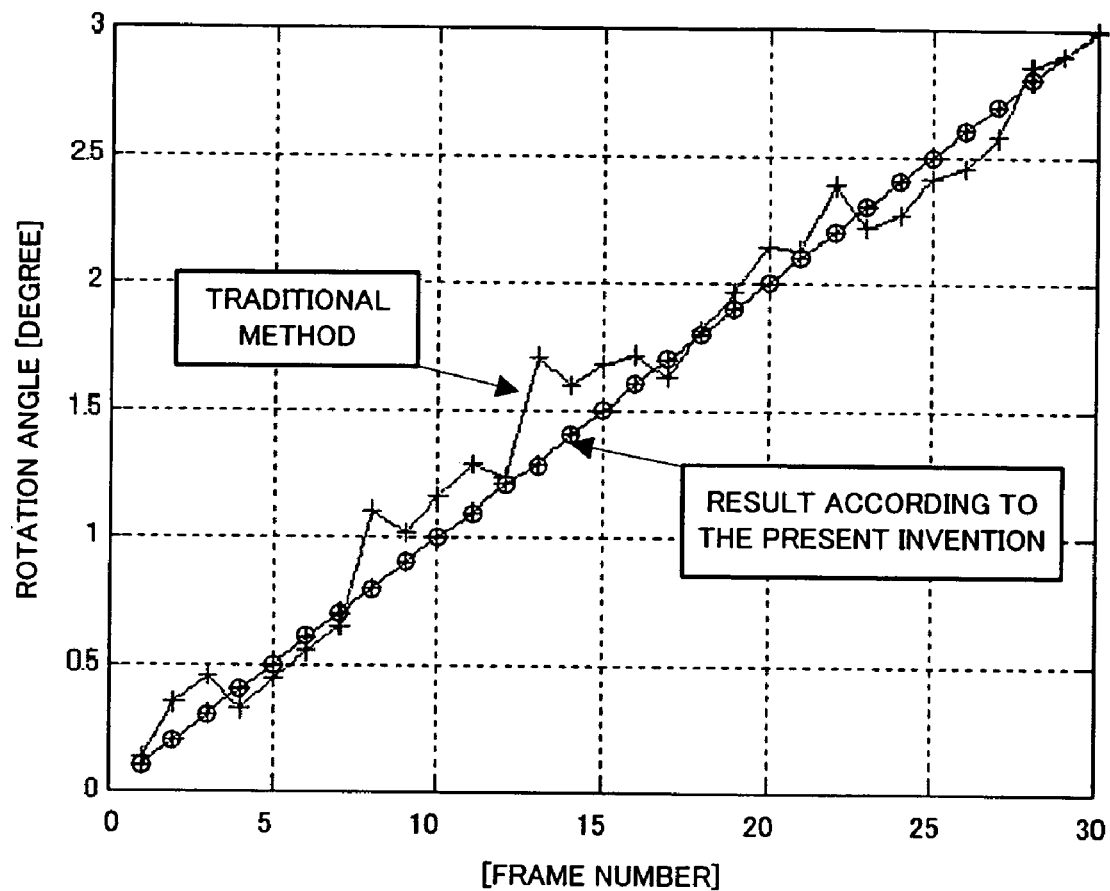
FIG. 24 is a diagram illustrating rotation measurement results of an image.

FIG. 24 shows the result that the rotation angle of the subsequent frames was measured with respect to the first frame. The traditional method indicated by crosses is the result that the image was split into areas of 6×6=36, the amount of translation was measured by matching in each small area, and the rotation angle was estimated using the amount of translation obtained. The method according to the invention indicated by circles is the result that the rotation angle measured by the traditional method was used as the initial estimated value and was adapted to the invention, and the rotation angle was measured more highly precisely. The situation that the rotation angle is varied by an angle of 0.1 degree at every frame can be accurately measured.

Figure 25:
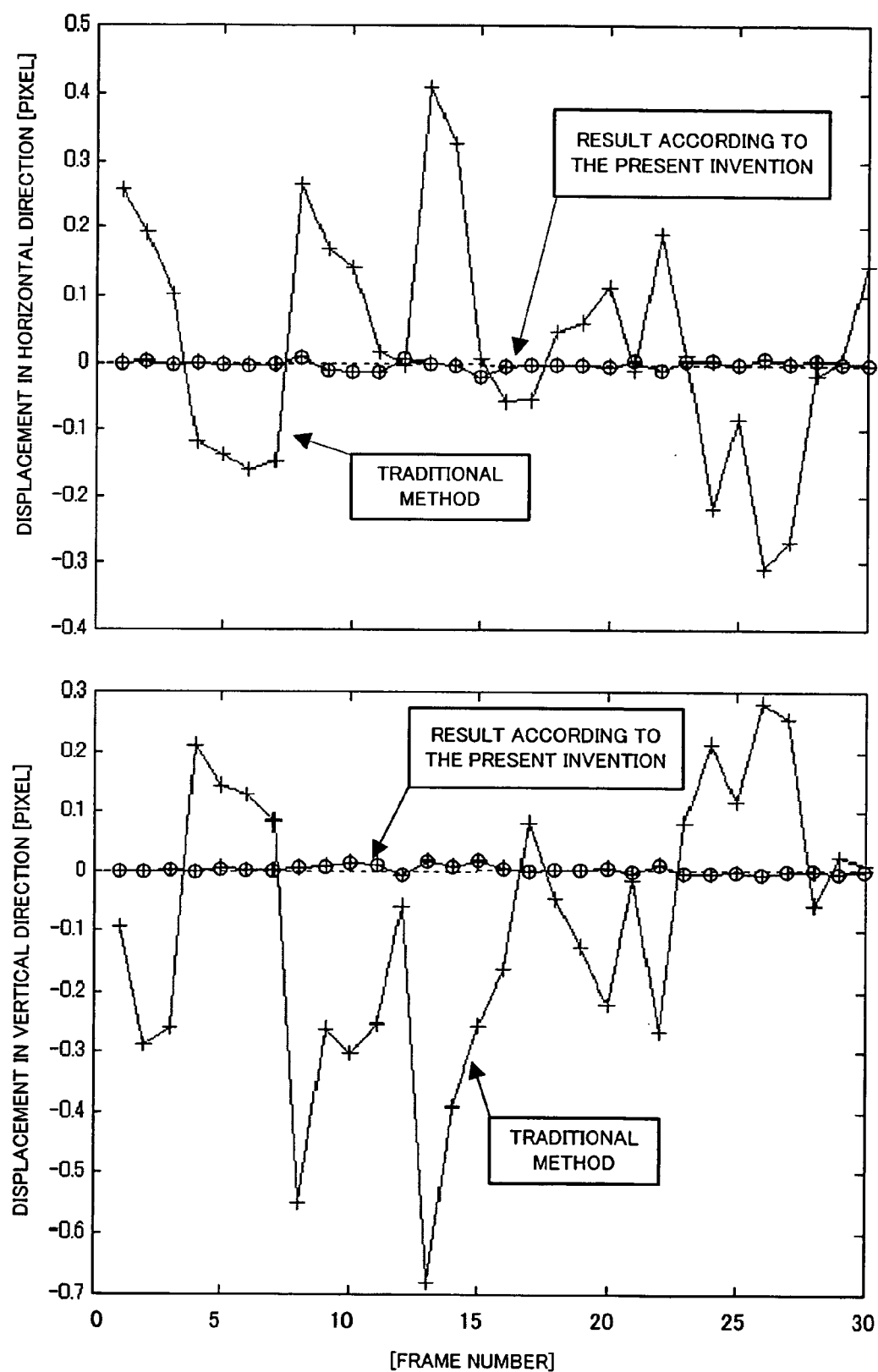
FIG. 25 is a diagram illustrating position sensing results of an image.

FIG. 25 shows the result that the positions of the subsequent frames were measured with respect to the first frame. The traditional method indicated by crosses is the result that the image was split into areas of 6×6=36, the amount of translation was measured by matching in each small area, and the positions were estimated as the average of the amount of translation. The method according to the invention indicated by circles is the result that the positions measured by the traditional method was used as the initial estimated value and was adapted to the invention, and the positions were was measured more highly precisely. The situation that the positions are not varied can be accurately measured.

<4> Other Embodiments of the Invention

Other embodiments of the multiparameter high precision concurrent estimation method in image subpixel matching according to the invention will be described as below.

<4-1> Combination of the Subpixel Estimation Error Reduction Method

Since the similarity of three positions is used for parabolic fitting when the sub-sampling grid estimation position is determined by Equation 60, the estimated value includes inherent estimation error. The estimation error can be cancelled by using an interpolation image. Here, an example is taken for description in the case where the subpixel position is estimated with respect to the horizontal direction displacement between images in two parameters.

Suppose a two-dimensional image function used for matching is $I_1(u,v), I_2(u,v)$, the horizontal subpixel position estimated by SSD and parabolic fitting can be expressed as below:

$$R_u(s, t) = \sum_{i,j \in W} (I_{1iu}(i, j) - I_2(i-s, j-t))^2 \quad \text{(Equation 76)}$$

$$\hat{d}_{s(t=0)} = \frac{R_u(-1, 0) - R_u(1, 0)}{2R_u(-1, 0) - 4R_u(0, 0) + 2R_u(1, 0)} - 0.5 \quad \text{(Equation 77)}$$

On the other hand, the horizontal interpolation image $I_{1iu}(u,v)$ for the image $I_1(u,v)$ can be expressed as:

$$I_{1iu}(u, v) = \frac{1}{2}(I_1(u-1, v) + I_1(u, v)) \quad \text{(Equation 78)}$$

Where (u,v) at this time is integers.

It can be considered that the horizontal interpolation image $I_{1iu}(u,v)$ is displaced only by (0.5,0) with respect to $I_1(u,v)$. When this interpolation image is used for subpixel estimation in SSD similarity shown below, it can be considered that the estimation result is also displaced by (0.5,0). Therefore, the estimation result that has corrected the displacement can be determined by the following equation.

$$R_{iu}(s, t) = \sum_{i,j \in W} (I_{1iu}(i, j) - I_2(i-s, j-t))^2 \quad \text{(Equation 79)}$$

$$\hat{d}_{is(t=0)} = \frac{R_{iu}(-1, 0) - R_{iu}(1, 0)}{2R_{iu}(-1, 0) - 4R_{iu}(0, 0) + 2R_{iu}(1, 0)} - 0.5 \quad \text{(Equation 80)}$$

Although Equation 78 also includes estimation error the same as Equation 60, the phase is inverted. Thus, the estimation error can be cancelled by the following equation.

$$\tilde{d}_{s(t=0)} = \frac{1}{2}(\hat{d}_{s(t=0)} + \hat{d}_{is(t=0)}) \quad \text{(Equation 81)}$$

<4-2> Affine Parameter Estimation

When the correspondence between images can be expressed by affine conversion, it is necessary to decide six parameters in a deformation model of the following Equation 82.

$$\begin{bmatrix} u_1 \\ v_1 \end{bmatrix} = \begin{bmatrix} a_{11} & a_{12} \\ a_{21} & a_{22} \end{bmatrix} \begin{bmatrix} u_2 \\ v_2 \end{bmatrix} + \begin{bmatrix} a_{13} \\ a_{23} \end{bmatrix} \quad \text{(Equation 82)}$$

Where (u1,v1), (u2,v2) are coordinates that indicate images I1 and I2, respectively, and image I2 is deformed and fit to image I1.

The similarity value obtained at discrete positions is used to estimate these six parameters highly precisely at the same time.

<4-3> Projection Parameter Estimation

When the correspondence between images can be expressed by projection conversion, it is necessary to decide eight parameters in a deformation model of the following Equation 83.

$$u_1 = \frac{a_1 u_2 + a_2 v_2 + a_3}{a_7 u_2 + a_8 v_2 + 1} \quad \text{(Equation 83)}$$

$$v_1 = \frac{a_4 u_2 + a_5 v_2 + a_6}{a_7 u_2 + a_8 v_2 + 1}$$

Where (u1,v1), (u2,v2) are coordinates that indicate images I1 and I2, respectively, and image I2 is deformed and fit to image I1.

The similarity value obtained at discrete positions is used to estimate these eight parameters highly precisely at the same time.

<4-4> Combination of a High Speed Search Method

It can be also considered that the sub-sampling grid estimation method according to the invention is a high precision process after the correspondence has been obtained correctly in the unit of sampling grids. Therefore, various acceleration methods already proposed can be used for search in the unit of sampling grids.

For example, for a high speed search method using density information of an image, there are a hierarchic structure search algorithm using an image pyramid, and a method that the upper limit value is set to SSD and SAD to terminate the subsequent integration. Furthermore, for a high speed search method using the characteristics of an image, there is a method that uses a density histogram of a focused area.

In addition, a computer program on which the multiparameter high precision concurrent estimation method in image subpixel matching according to the invention is implemented is executed by an information process terminal equipped with CPU (computers such as a personal computer and a workstation), and thus a synthetic image or a real image is used to estimate multiple parameters highly precisely at the same time.

ADVANTAGE OF THE INVENTION

As described above, according to the invention, translation between images, rotation, and scale variation can be estimated highly precisely at the same time. More specifically, according to the multiparameter high precision concurrent estimation method in image subpixel matching according to the invention, when the correspondence between images has not only translation but also rotation and scale variation, correspondence parameters between images can be estimated highly precisely at the same time without recursive computation. In the invention, since recursive computation is not used as traditionally implemented, there is no need to interpolate an image at every computation.

Furthermore, according to the invention, a template image is used to create fewer interpolation images, and the similarity value between images using these interpolation images are used to estimate translation as well as rotation and scale variation highly precisely at the same time. As different from parameter optimization methods generally used, the invention uses no recursive computation. Thus, computation is simple, computation time can be expected, there is no need to assure convergence properties that are a problem when recursive computation is conducted, and instability caused by the initial value is not generated. More specifically, according to the invention, the problem of convergence properties generated in the traditional method and the problem of the initial value can be eliminated.

INDUSTRIAL APPLICABILITY

As described below, the invention can be applied to various fields of image processing. For example, in mapping using remote sensing and aerial photographs, combining multiple images, that is, mosaicing is often implemented. At this time, region-based matching is implemented in order to obtain correspondence positions between images. At this time, it is important to determine correct correspondence as well as to determine correspondence by finer resolution in pixels. Moreover, since a large number of images are used to determine correspondence, high speed computation is also important. When region-based matching is used to determine correspondence equal to or above pixel resolution, the similarity evaluation value that is determined at non-consecutive positions in pixels is used for subpixel estimation by a fitting function. The invention is applied at this time, and thus correspondence position of much higher precision can be determined with a slight increase in computation time.

Particularly, when an oblique component is contained in an image pattern, that is, when a pattern such as a traffic intersection is taken as tilted with respect to an image coordinate system, for example, upon making a map, advantages of the invention are further exerted.

Furthermore, in stereo vision, a basic process is to determine correspondence positions between multiple images, and the correspondence position accuracy greatly influences the final result accuracy. Constraint conditions such as epipolar constraint are used when correspondence positions between images, but it is necessary to check the correspondence between images even when the epipolar constraint condition itself is determined. Thus, the epipolar constraint cannot be used at this time. Therefore, since the invention is applied to determine the epipolar constraint condition highly precisely, as the result, a highly precise stereo process can be implemented.

Moreover, when MPEG compression is conducted, it is necessary to accurately determine correspondence positions between adjacent frames in order to achieve a high compression rate of high quality. The correspondence position between adjacent frames is usually determined in the unit of ½ pixels. Since a one-dimensional simple method using the similarity evaluation value of SAD and SSD at this time, a great error is likely to be included. However, since the invention can determine the correspondence between images more surely, highly precisely with a slight increase in the amount of computation as compared with the traditional one-dimensional estimation method, the compression rate for generating MPEG images can be improves.

LIST OF REFERENCES

Nonpatent Literature 1: Masao Shimizu and Masatoshi Okutomi, "High-accuracy Sub-Pixel Estimation Method In Image Matching", Paper of the Institute of Electronics, Information and Communication Engineers of Japan D-II, Vol. J84-D-II, No. 7, pp. 1409-1418, June (2001)

Nonpatent Literature 2: Masao Shimizu and Masatoshi Okutomi, "Meanings And Properties Of High-accuracy Sub-Pixel Estimation In Image Matching", Paper of the Institute of Electronics, Information and Communication Engineers of Japan D-II, Vol. J85-D-II, No. 12, pp. 1791-1800, December (2002)

Nonpatent Literature 3: Masao Shimizu and Masatoshi Okutomi, "Precise Sub-Pixel Estimation On Area-Based Matching", Proc. $8^{th}$ IEEE International Conference on Computer Vision (ICCV2001), (Vancouver, Canada), pp. 90-97, June (2001)

Nonpatent Literature 4: Masao Shimizu and Masatoshi Okutomi, "An Analysis Of Sub-Pixel Estimation Error On Area-Based Image Matching", Proc. $14^{th}$ International Conference on Digital Signal Processing (DSP2002), (Santorini, Greek), Vol. II, pp. 1239-1242 (W3B.4), June (2002)

Nonpatent Literature 5: C. Quentin Davis, Zoher Z. Karu and Dennis M. Freeman, "Equivalence of Subpixel Motion Estimators Based On Optical Flow and Block Matching", IEEE International Symposium for Computer Vision 1995, (Florida, USA), pp. 7-12, November (1995)

Nonpatent Literature 6: Samson J. Timoner and Dennis M. Freeman, "Multi-Image Gradient-Based Algorithms For Motion Estimation", Optical Engineering, (USA), Vol. 40, No. 9, pp. 2003-2016, September (2001)

Nonpatent Literature 7: Jonathan W. Brandt, "Improved Accuracy in Gradient-Based Optical Flow Estimation", International Journal of Computer Vision), (USA), Vol. 25, No. 1, pp. 5-22 (1997)

Nonpatent Literature 8:

Q. Tian and M. N. Huhns, "Algorithms For Subpixel Registration", computer vision, Computer Vision, Graphics and Image Processing, (USA), Vol. 35, pp. 220-233 (1986)

Nonpatent Literature 9: Sean Borman, Mark A. Robertson and Robert L. Stevenson, "Block-Matching Sub-Pixel Motion Estimation From Noisy, Under-Sampled Frames—An Empirical Performance Evaluation", SPIE Visual Communications and Image Processing 1999), (California, USA)

What is claimed is:

1. A multiparameter high precision concurrent estimation method in image subpixel matching in which in an N-dimensional similarity space where N (N is an integer of four or greater) correspondence parameters between images are axes, said N correspondence parameters between images are estimated concurrently by using an N-dimensional similarity value between images obtained at discrete positions, comprising the steps of:

determining a sub-sampling position where said N-dimensional similarity value between images is maximum or minimum on a line in parallel with a certain parameter axis, and determining an N-dimensional hyperplane that most approximates determined said sub-sampling position;

determining N of said N-dimensional hyperplanes with respect to each parameter axis;

determining an intersection point of N of said N-dimensional hyperplanes; and setting said intersection point as a sub-sampling grid estimation position for said correspondence parameter between images that gives a maximum value or a minimum value of N-dimensional similarity in said N-dimensional similarity space; and displaying an image deformed by said N correspondence parameters between images that were estimated.

2. A three-parameter high precision concurrent estimation method in image subpixel matching in which in a three-dimensional similarity space where three correspondence parameters between images are axes, said three correspondence parameters between images are estimated concurrently by using a three-dimensional similarity value between images obtained at discrete positions, comprising the steps of:

determining a sub-sampling position where said three-dimensional similarity value between images is maximum or minimum on a line in parallel with a certain parameter axis, and determining a plane that most approximates determined said sub-sampling position;

determining three of said planes with respect to each parameter axis;

determining an intersection point of three of said planes;

setting said intersection point as a sub-sampling grid estimation position for said correspondence parameter between images that gives a maximum value or a minimum value of three-dimensional similarity in said three-dimensional similarity space; and displaying an image deformed by said three correspondence parameters between images that were estimated.

3. A two-parameter high precision concurrent estimation method in image subpixel matching in which displacements between images in horizontal and vertical directions that give a maximum value or a minimum value of a two-dimensional similarity in a continuous area is are estimated by using a two-dimensional similarity value between images obtained discretely, comprising the steps of:

determining a sub-sampling position where said two-dimensional similarity value between images is maximum or minimum on a line in parallel with a horizontal axis, and determining a line (horizontal extreme value line HEL) that most approximates determined said sub-sampling position;

determining a sub-sampling position where said two-dimensional similarity value between images is maximum or minimum on a line in parallel with a vertical axis, and determining a line (vertical extreme value line VEL) that most approximates determined said sub-sampling position;

determining an intersection point of said horizontal extreme value line HEL and said vertical extreme value line VEL; and setting said intersection point as a subpixel estimation position for said displacements between images in horizontal and vertical directions that give a maximum value or a minimum value of said two-dimensional similarity; and displaying an image deformed by said displacements between images in horizontal and vertical directions that were estimated.

4. A multiparameter high precision concurrent estimation method in image subpixel matching in which in an N-dimensional similarity space where N (N is an integer of four or greater) correspondence parameters between images are axes, said N correspondence parameters between images are estimated concurrently by using an N-dimensional similarity value between images obtained at discrete positions, comprising the steps of:

determining a sub-sampling position where said N-dimensional similarity value between images is maximum or minimum on a line in parallel with a certain parameter axis, and determining an N-dimensional hyperplane that most approximates determined said sub-sampling position;

determining N of said N-dimensional hyperplanes with respect to each parameter axis;

determining an intersection point of N of said N-dimensional hyperplanes;

setting said intersection point as a sub-sampling grid estimation position for said correspondence parameter between images that gives a maximum value or a minimum value of N-dimensional similarity in said N-dimensional similarity space; and displaying said N correspondence parameters between images that were estimated with numerical value.

5. A three-parameter high precision concurrent estimation method in image subpixel matching in which in a three-dimensional similarity space where three correspondence parameters between images are axes, said three correspondence parameters between images are estimated concurrently by using a three-dimensional similarity value between images obtained at discrete positions, comprising the steps of:

determining a sub-sampling position where said three-dimensional similarity value between images is maximum or minimum on a line in parallel with a certain parameter axis, and determining a plane that most approximates determined said sub-sampling position;

determining three of said planes with respect to each parameter axis;

determining an intersection point of three of said planes;

setting said intersection point as a sub-sampling grid estimation position for said correspondence parameter between images that gives a maximum value or a minimum value of three-dimensional similarity in said three-dimensional similarity space; and displaying said three correspondence parameters between images that were estimated with numerical value.

6. A two-parameter high precision concurrent estimation method in image subpixel matching in which displacements between images in horizontal and vertical directions that give a maximum value or a minimum value of a two-dimensional similarity in a continuous area are estimated by using a two-dimensional similarity value between images obtained discretely, comprising the steps of:

determining a sub-sampling position where said two-dimensional similarity value between images is maximum or minimum on a line in parallel with a horizontal axis, and determining a line (horizontal extreme value line HEL) that most approximates determined said sub-sampling position;

determining a sub-sampling position where said two-dimensional similarity value between images is maximum or minimum on a line in parallel with a vertical axis, and determining a line (vertical extreme value line VEL) that most approximates determined said sub-sampling position;

determining an intersection point of said horizontal extreme value line HEL and said vertical extreme value line VEL; and setting said intersection point as a subpixel estimation position for said displacements between images in horizontal and vertical directions that give a maximum value or a minimum value of said two-dimensional similarity; and displaying said displacements between images in horizontal and vertical directions that were estimated with numerical value.

* * * * *